(12) United States Patent
Jeong et al.

(10) Patent No.: US 10,802,676 B2
(45) Date of Patent: Oct. 13, 2020

(54) METHOD AND APPARATUS FOR SETTING PARAMETER

(71) Applicant: Hanwha Techwin Co., Ltd., Seongnam-si (KR)

(72) Inventors: Kyoung Jeon Jeong, Seongnam-si (KR); Sung Pil Chun, Seongnam-si (KR); Jin Hyuk Choi, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/251,825

(22) Filed: Jan. 18, 2019

(65) Prior Publication Data
US 2019/0163328 A1 May 30, 2019

Related U.S. Application Data

(63) Continuation of application No. PCT/KR2016/008137, filed on Jul. 26, 2016.

(30) Foreign Application Priority Data

Jul. 21, 2016 (KR) ........................ 10-2016-0092710

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0236* (2013.01); *G06F 3/0485* (2013.01);
(Continued)

(58) Field of Classification Search
CPC .... G06F 3/04847; G06F 3/048; G06F 3/0488; G06F 3/0236; G05D 1/0011–005
See application file for complete search history.

(56) References Cited

U.S. PATENT DOCUMENTS 8,457,809 B2 6/2013 Lee et al.
8,676,406 B2 3/2014 Coffman et al.
(Continued)

FOREIGN PATENT DOCUMENTS

JP 201325788 2/2013
JP 2014197164 10/2014
(Continued)

*Primary Examiner* — Liang Y Li
(74) *Attorney, Agent, or Firm* — H.C. Park & Associates, PLC

(57) ABSTRACT

A method for setting a parameter includes the steps of: selecting, by a touch or click, one point on an electronic map displayed on an electronic device; displaying a parameter input area around the selected one point on the electronic map; detecting, by the electronic device, panning or drag performed along a direction in which the displayed parameter input area is formed; adjusting a value of the parameter according to the detected panning or drag; detecting, by the electronic device, panning or drag performed in a direction toward the one point; and setting the parameter to the adjusted value, wherein the touch or click is maintained while the steps of setting the one point through setting the parameter is performed.

18 Claims, 47 Drawing Sheets

(51) Int. Cl.
*G06F 3/0484* (2013.01)
*G06F 3/023* (2006.01)
*G06F 3/0485* (2013.01)
*G06F 3/0481* (2013.01)
*G06F 3/0486* (2013.01)

(52) U.S. Cl.
CPC .......... *G06F 3/0486* (2013.01); *G06F 3/0488* (2013.01); *G06F 3/04817* (2013.01); *G06F 3/04847* (2013.01); *G06F 3/04883* (2013.01)

(56) References Cited

U.S. PATENT DOCUMENTS

| | | | |
|---|---|---|---|
| 10,503,264 | B1* | 12/2019 | Blachly .................. G06F 3/0488 |
| 2009/0242282 | A1 | 10/2009 | Kim et al. |
| 2013/0311954 | A1* | 11/2013 | Minkkinen ......... G06F 3/04812 |
| | | | 715/862 |
| 2014/0253479 | A1 | 9/2014 | Sato et al. |
| 2014/0351753 | A1* | 11/2014 | Shin ..................... G06F 3/0482 |
| | | | 715/810 |
| 2015/0260525 | A1* | 9/2015 | Parthasarathy ........ G01C 23/00 |
| | | | 701/538 |
| 2016/0139595 | A1 | 5/2016 | Yang et al. |
| 2016/0306545 | A1* | 10/2016 | Voisin ................. G06F 3/04847 |
| 2017/0199652 | A1* | 7/2017 | Campbell ........... G06F 3/04845 |

FOREIGN PATENT DOCUMENTS

| | | |
|---|---|---|
| JP | 2015022571 | 2/2015 |
| KR | 20090104987 | 10/2009 |
| KR | 20100990833 | 11/2010 |
| KR | 20120029229 | 3/2012 |
| KR | 20130029831 | 3/2013 |
| KR | 20160058471 | 5/2016 |

* cited by examiner

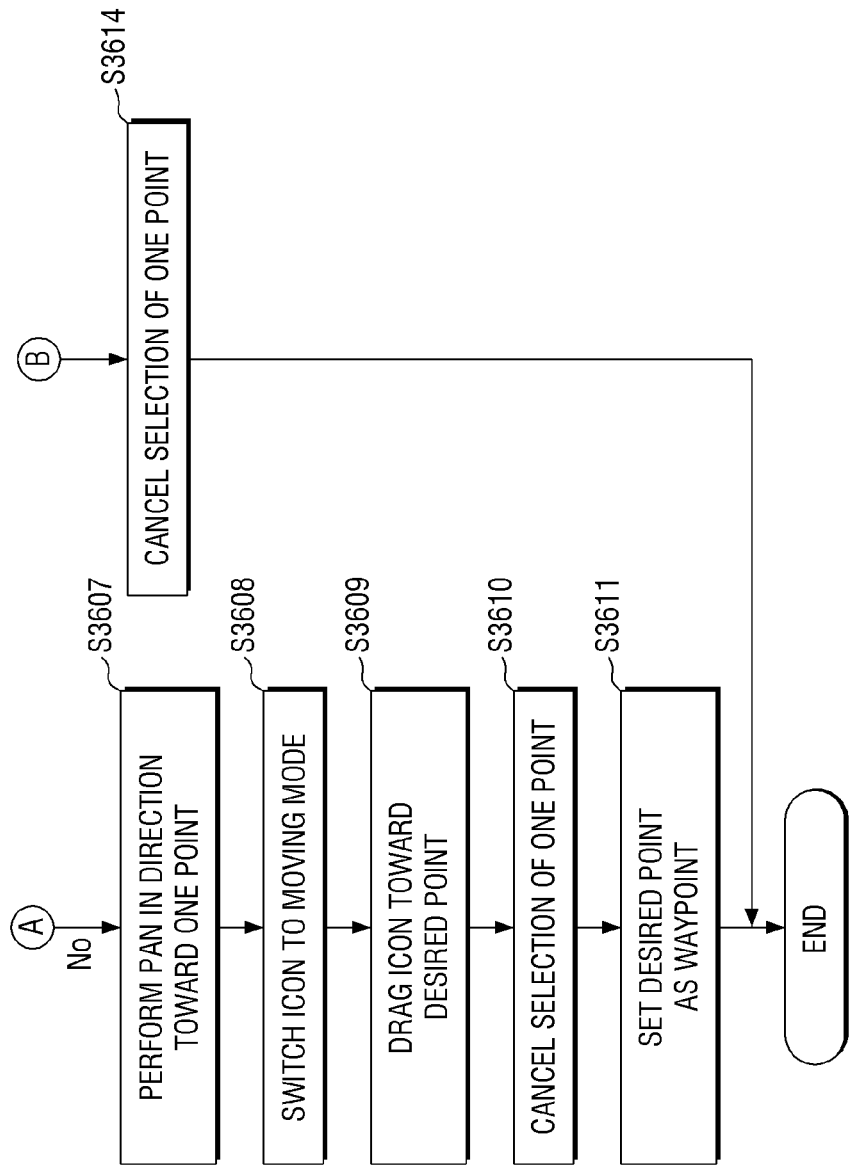

METHOD AND APPARATUS FOR SETTING PARAMETER

CROSS REFERENCE TO RELATED APPLICATIONS

This application is a Bypass Continuation of International Patent Application No. PCT/KR2016/008137, filed on Jul. 26, 2016, and claims priority to and the benefit of Korean Patent Application No. 10-2016-0092710, filed on Jul. 21, 2016, which is hereby incorporated by reference for all purposes as if fully set forth herein.

BACKGROUND

Field

Exemplary embodiments of the invention relate generally to a method and apparatus for setting a parameter, and more specifically, a method and apparatus for setting a parameter, which can reduce the inconvenience of repeating multiple touches and touch cancellations on a display unit to set each parameter.

Discussion of the Background

Recently, research has been vigorously conducted on moving objects, particularly unmanned moving objects, and various types of unmanned moving objects and various technology for controlling unmanned moving objects have been developed. In addition, various developments have been made in controllers ranging from existing analog controllers to controllers that can be used in various devices such as tablets and smartphones. Accordingly, users can easily perform various operations using unmanned moving objects.

A waypoint refers to an operation of setting points to be passed by an unmanned moving object to determine the path of the unmanned moving object. The path to be taken by the unmanned moving object is determined by connecting waypoints. When a user sets waypoints for the unmanned moving object via a controller, the unmanned moving object can travel along the travel path being generated.

The waypoints of the unmanned moving object are a major function of the protocol of the unmanned moving object and are thus normally inserted in the controller. Thus, it is important to consider UI/UX to make setting easy and convenient for the user.

However, according to the prior art, it is not easy to set waypoints on a map displayed on the controller or to select an arbitrary point on the map and then enter particular parameters. Specifically, the steps of selecting an arbitrary point on an electronic map, moving an icon to a desired point to set a waypoint at the exact point, and entering various parameters to the waypoint are all separate. Here, the parameters refer to various items that the user desires to set for the moving object when setting waypoints that the moving object is to pass by while traveling along a path. For example, there are the speed and the altitude of the moving object when the moving object is to pass by a particular waypoint, whether the moving object is to hover when passing by the particular waypoint, and the exposure value, FPS, and resolution at the time of camera shooting. When there are multiple parameters to be set, multiple windows are generated one by one whenever each parameter is set, and numerical values need to be entered or adjusted manually. Accordingly, there has been the inconvenience of performing multiple touches or clicks or cancellations thereof repeatedly via the controller with a finger or the like.

The above information disclosed in this Background section is only for understanding of the background of the inventive concepts, and, therefore, it may contain information that does not constitute prior art.

SUMMARY

Devices constructed/methods according to exemplary implementations/embodiments of the invention are capable of setting a parameter, which can reduce the inconvenience of repeating multiple touches or touch cancellations on a display unit to set each parameter.

Additional features of the inventive concepts will be set forth in the description which follows, and in part will be apparent from the description, or may be learned by practice of the inventive concepts.

According to an exemplary embodiment of the present invention, a method of setting a parameter includes: selecting, by a touch or click, one point on an electronic map displayed on an electronic device; displaying a parameter input area around the selected one point on the electronic map; detecting, by the electronic device, a pan or drag performed along a direction in which the displayed parameter input area is formed; adjusting a value of the parameter according to the detected pan or drag; detecting, by the electronic device, a pan or drag performed in a direction toward the one point; and setting the parameter to the adjusted value, wherein the touch or click needs to be maintained while the steps ranging from the selecting the one point to the setting the parameter are being performed.

According to another exemplary embodiment, an apparatus for setting a parameter includes: a display unit displaying an electronic map; a communication unit transmitting signals and data to, and receiving signals and data from, the outside in a wired or wireless manner; a storage unit storing the signals and the data; and a control unit controlling operations of the display unit, the communication unit, and the storage unit, wherein if one point on the electronic map is selected by a touch or click, the display unit displays a parameter input area around the one point, the control unit adjusts a value of a parameter if a pan or drag is performed on the parameter input area along a direction in which the parameter input area is formed, and sets the parameter to the adjusted value if a pan or drag is performed in a direction toward the one point, and the operations ranging from the selection of the one point to the setting of the parameter are performed only if the touch or click is maintained.

Additional features of the inventive concepts will be set forth in the description which follows, and in part will be apparent from the description, or may be learned by practice of the inventive concepts.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 36A and 36B are flowcharts illustrating a parameter setting method according to a fourth exemplary embodiment of the present invention.

DETAILED DESCRIPTION

Figure 1:
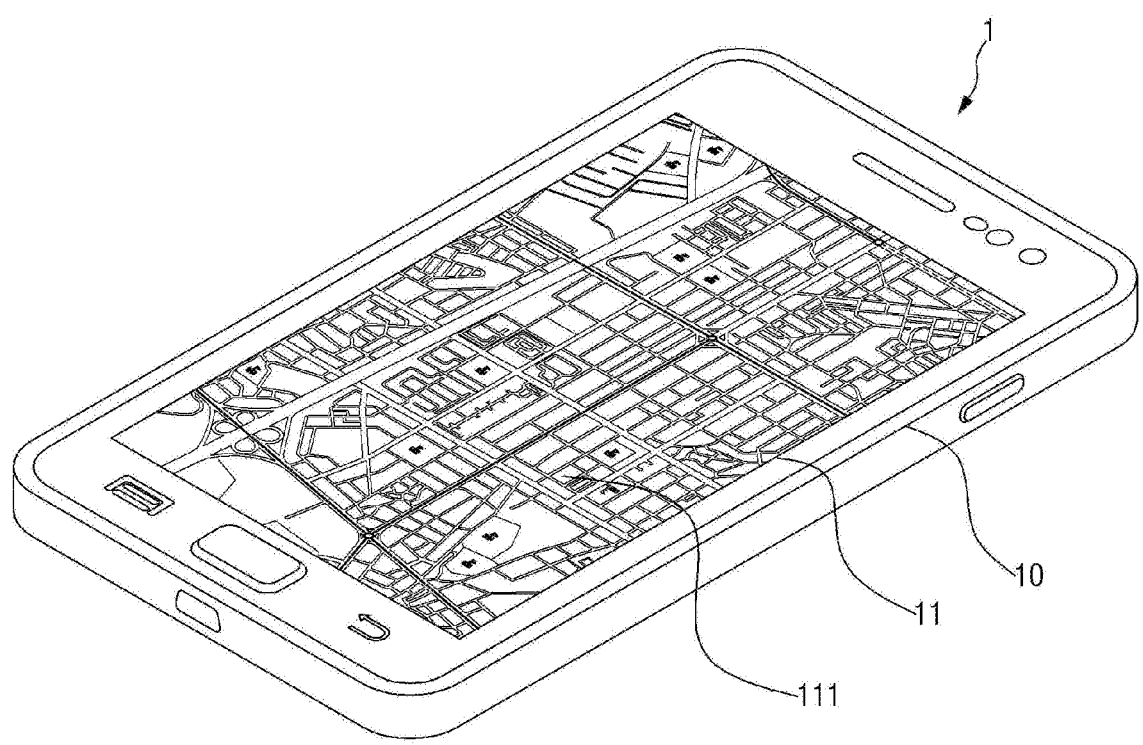
FIG. 1 is a perspective view of an electronic device 1 in which exemplary embodiments of the present invention can be realized.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or othermanufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an electronic device 1 in which exemplary embodiments of the inventive concepts can be realized.

In a parameter setting method according to exemplary embodiments, when the electronic device 1 displays an electronic map 111, a desired point can be selected on the electronic map 111. Then, a parameter can be set for the selected point.

The electronic device 1 includes a main body, a display unit 11, and an electronic map 111 displayed as an image via the display unit 11. The electronic device 1 may be a device providing a touch function, such as a smartphone, a tablet PC, and a navigation device, but the present invention is not limited thereto. The electronic device 1 may also be a device for inputting a user command via a mouse, such as a desktop, a laptop, or the like. That is, the electronic device 1 includes various types of devices as long as they can display the electronic map 111 and can allow a user to select a desired point from the electronic map 111.

The electronic map 111 refers to various maps that can be formed as images via the display unit 11 included in the electronic device 1. Examples of the electronic map 111 may include an electronic map 111 provided on a web site or on a mobile by a conventional portal site, an electronic map 111 provided on a mobile by a mobile application provider, an electronic map 111 provided to a navigation device by a navigation company, and various other electronic maps 111.

Figure 2:
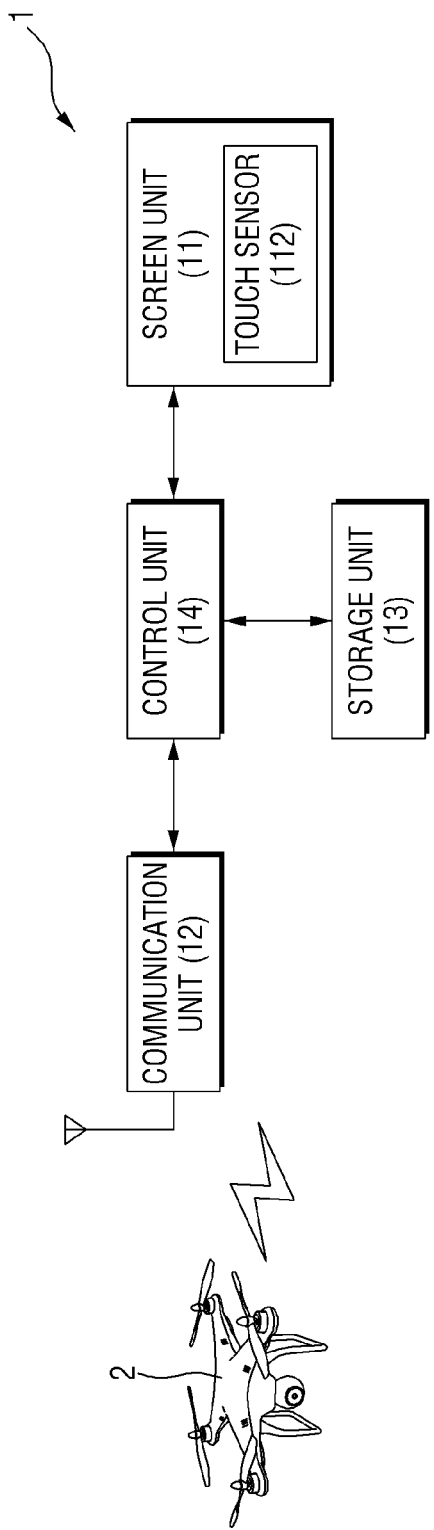
FIG. 2 is a block diagram showing the structure of the electronic device of FIG. 1.

FIG. 2 is a block diagram showing the structure of the electronic device 1 of FIG. 1.

Referring to FIG. 2, the electronic device 1 includes the display unit 11, a communication unit 12, a storage unit 13, and a control unit 14.

The display unit 11 displays the electronic map 111 so that the user can monitor the electronic map 111, and displays an icon 20 and a parameter input area (21, 22, 23, and 24) on the electronic map 111 in accordance with the selection of one point by the user.

The electronic device 1 may not provide a touch function, in which case, an input unit is provided separately. The most commonly used input units include a mouse, keyboard, joystick, and a remote controller. However, if the electronic device 1 provides a touch function, the display unit 11 may include a touch sensor 112. In this case, the user can directly input a touch signal to the display unit 11. The touch sensor 112 may be integrally mounted in one body with the display unit 11. The touch sensor 112 senses touch input generated on the display unit 11, detects the coordinates of the location of the touch input and the number and intensity of touches of the touch input, and transmits the results of the detection to the control unit 14. Various methods such as an electro-static capacitance type, an electric resistance film type, an ultrasonic type, and an infrared type can be used depending on the manner in which the touch sensor 112 senses touch input. A touch can be performed using a finger, but the present invention is not limited thereto. A touch can also be performed using a stylus pen with a tip that can flow a minute current therethrough. Even if the electronic device 1 provides a touch function, a separate touch pad may be provided as an input unit if the display unit 11 does not include the touch sensor 112. The electronic device 1 will hereinafter be described as being a device that provides a touch function. This, however, is not for limiting the scope of the present invention, but for the convenience of explanation.

The communication unit 12 transmits signals and data to, and receives signals and data from, an unmanned moving object 2 in a wired/wireless manner. For example, the communication unit 12 transmits signals and data received from the control unit 14 after performing modulation and frequency up-conversion on the signals and the data, or provides signals and data received from the unmanned moving object 2 to the control unit 14 after performing frequency down-conversion and demodulation on the signals and the data. In this process, the communication unit 12 may receive image data or signals from the unmanned moving object 2 and may transmit control signals and data generated by the control unit 14 to the unmanned moving object 2.

The storage unit 13 stores programs for processing and controlling operations of the electronic device 1, various data generated during the execution of each program, and image data transmitted via the unmanned moving object 2. The storage unit 13 may be embedded in the electronic device 1, but may be provided as a separate device on the outside of the electronic device 1.

The control unit 14 controls overall operations of the electronic device 1. For example, the control unit 14 performs processing and control operations for the signal and data communication of the unmanned moving object 2, and performs image processing such as decoding and rendering in response to an image being received via the communication unit 12. Also, in response to the user's command being input, the control unit 14 generates a command signal and transmits it to the unmanned moving object 2 via the communication unit 12. Also, the control unit 14 controls the display unit 11 to display the electronic map 111 and to display the icon 20 and the parameter input area (21, 22, 23, and 24) on the electronic map 111, and also controls the storage unit 13 to store image data. A central processing unit (CPU), a micro-controller unit (MCU), or a digital signal processor (DSP) may preferably be used as the control unit 14, but the present invention is not limited thereto. Various logic operation processors may also be used as the control unit 14.

The control unit 14 includes a gesture detector and a coordinate converter. The gesture detector detects a touch gesture from the touch sensor 112. The term "touch gesture" encompasses all touch operations that occur in the touch sensor 112. If the electronic device 1 does not provide a touch function, a user command input via an input unit such as a mouse or the like may be detected. The gesture detector manages the touch sensor 112 and includes an application program interface (API) facilitating the user's use of touch gestures in an application. The API is an interface controlling functions provided by an operating system or programming language to be used in an application program. The gesture detector receives, via the API, a user command for executing a camera control application via the API and a user command for controlling an activated application.

The coordinate converter receives coordinates corresponding to a user command from the gesture detector and generates a movement value based on the coordinates. If the user touches one point on the electronic map 111 or on the parameter input area (21, 22, 23, and 24) to perform a pan, the coordinates of the one point are extracted. Then, if the user performs a pan on the electronic map 111 or the parameter input area (21, 22, 23, and 24), coordinates on the path of the pan are extracted at regular intervals. The coordinate converter can determine the direction and the distance of the pan based on the extracted coordinates and converts them into a movement value or a parameter input value for the icon 20 on the electronic map 111. By using this value, the icon 20 may be moved, or the parameter input area (21, 22, 23, and 24) may be changed, and such change in the icon 20 or the parameter input area (21, 22, 23, and 24) may be displayed via the display unit 11 in accordance with a pan command from the user.

Figure 3:
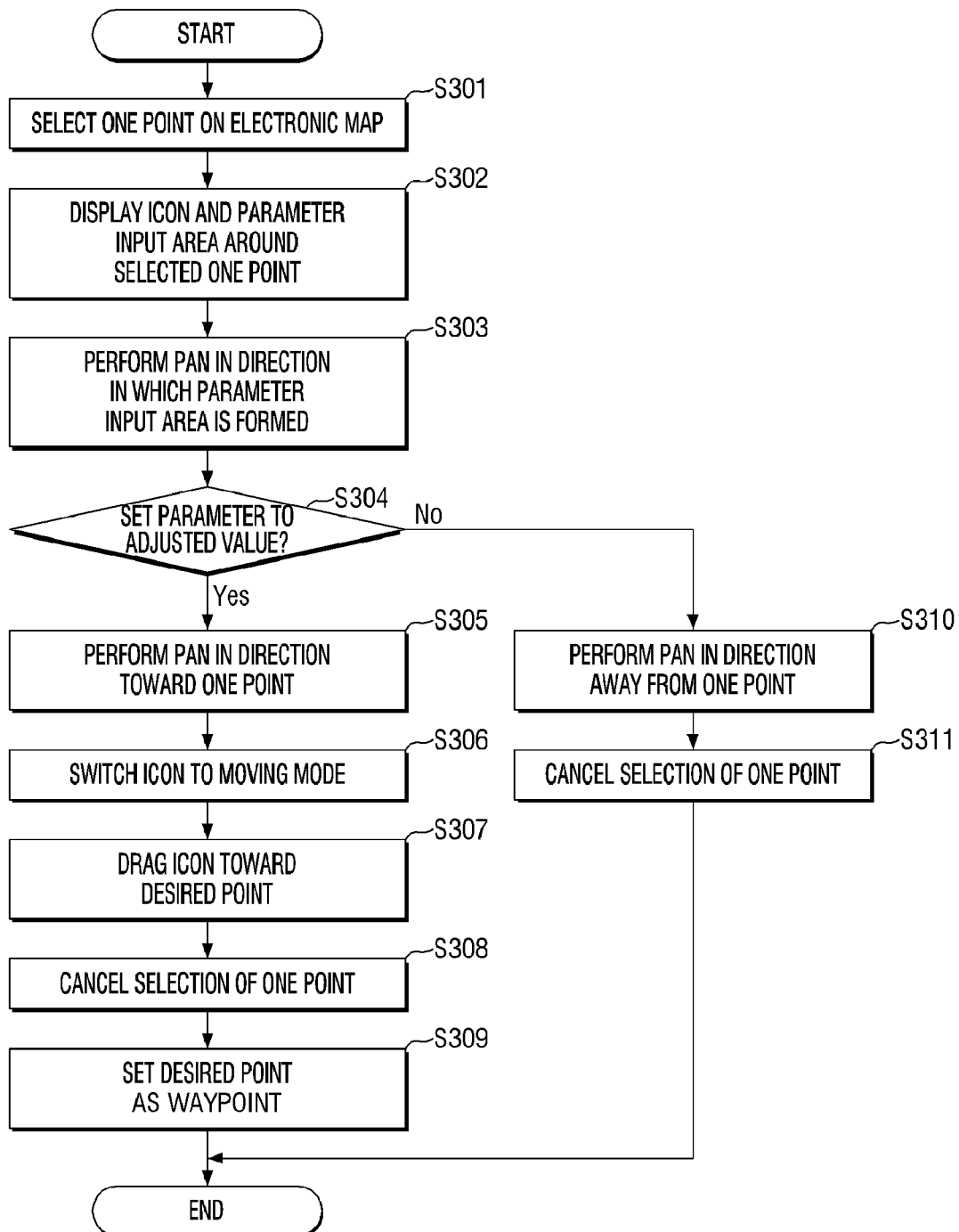
FIG. 3 is a flowchart illustrating a parameter setting method according to a first exemplary embodiment of the present invention.

FIG. 3 is a flowchart illustrating a parameter setting method according to a first exemplary embodiment of the present invention.

The expression "the setting of a parameter", as used herein, refers to setting detailed items such as the altitude, speed, and the like of the moving object 2 when setting waypoints that the moving object 2 is to pass by on the electronic map 111. In the first exemplary embodiment, a point is selected, and then, a pan is performed to adjust the value of a parameter. Each step in the flowchart of FIG. 3 will hereinafter be described with reference to FIGS. 4 through 8.

Figure 4:
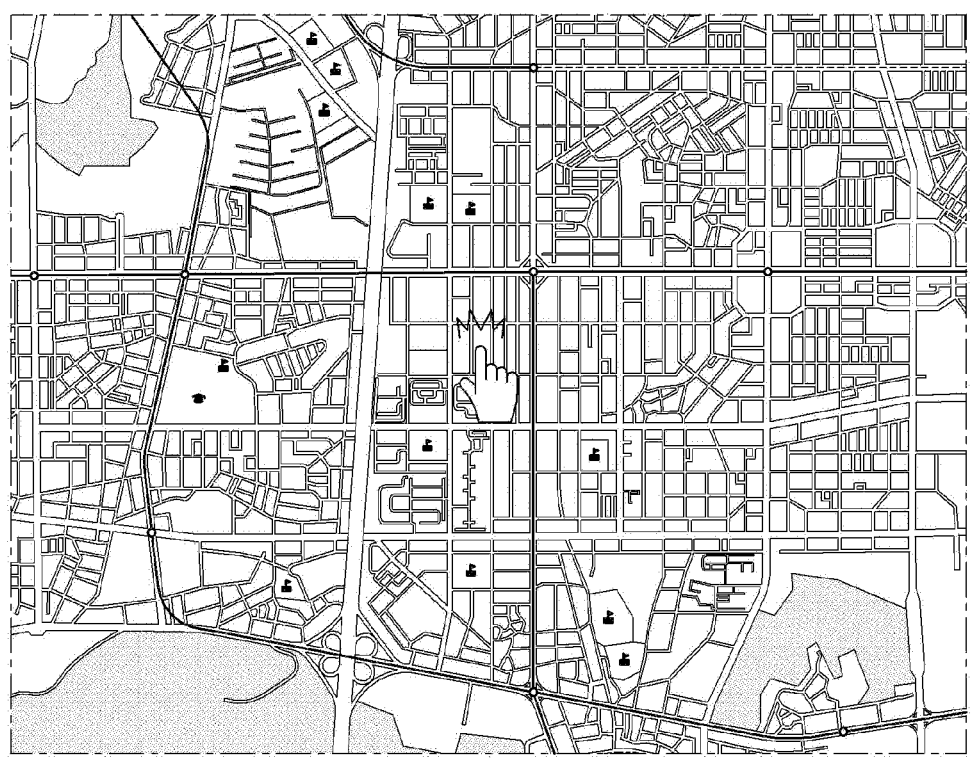
FIG. 4 is a view illustrating how to select one point on an electronic map to perform the parameter setting method according to the first exemplary embodiment.

FIG. 4 is a view illustrating how to select one point on the electronic map 111 to perform the parameter setting method according to the first exemplary embodiment.

To designate a waypoint at a desired point, the user selects one point on the electronic map 111 (S401). If the electronic device 1 provides a touch function, the user may select one point by performing a touch with a finger or the like. On the other hand, if the user can input a command to the electronic device 1 via a mouse, the user may select one point by placing the mouse cursor at the corresponding point and clicking the mouse. As already mentioned above, the electronic device 1 will be described as being a device that provides a touch function, and thus, each user command will be described as being entered by a touch performed by the user. This, however, is not for limiting the scope of the present invention, but for the convenience of explanation.

The desired point is a point on the electronic map 111 where the user desires to set a waypoint, and the one point refers to a point actually selected from the electronic map 111 by the user. Even if the user intends to select the desired point, the user may actually select another point different from the desired point due to, for example, failure to sufficiently enlarge the electronic map 111 or the difficulty of selecting the exact desired point because of the contact area of a finger or the like.

Figure 5:
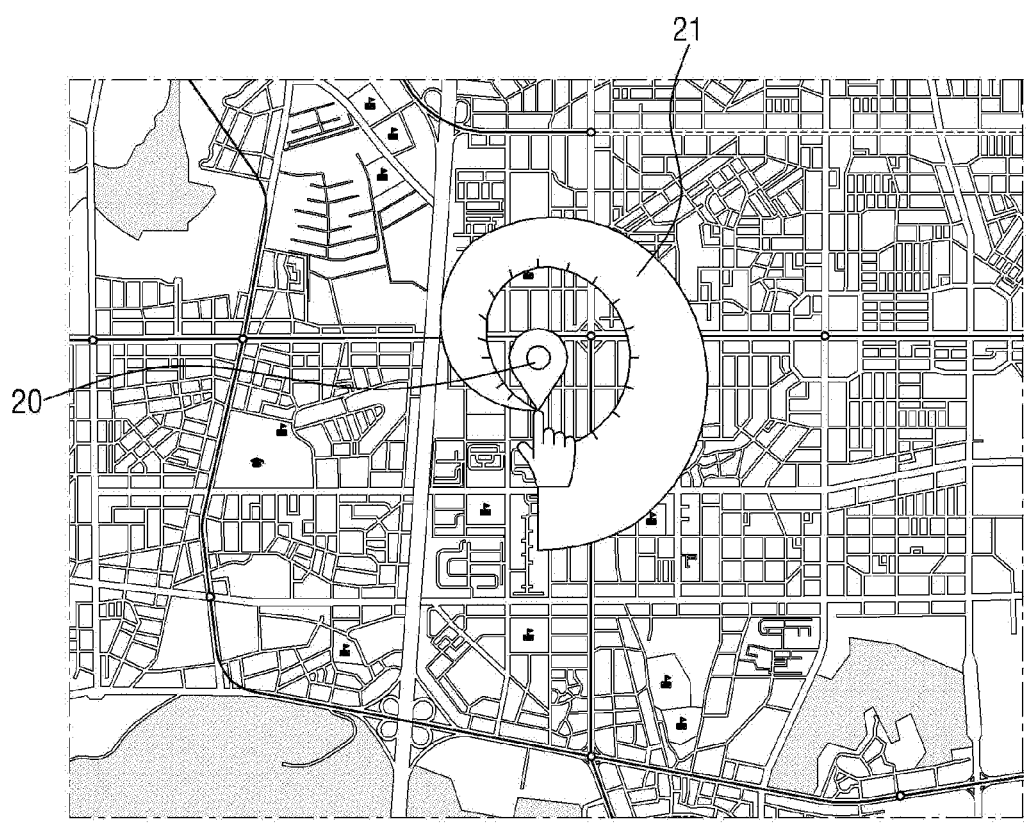
FIG. 5 is a view illustrating how to display an icon and a parameter input area according to the first exemplary embodiment on the electronic map as a result of the operation of FIG. 4.

FIG. 5 is a view illustrating how to display the icon 20 and a parameter input area 21 according to the first exemplary embodiment on the electronic map 111 as a result of the operation of FIG. 4.

In response to the user touching one point on the electronic map 111, the icon 20 is displayed at the one point, and at the same time, the parameter input area 21 is displayed (S402), as illustrated in FIG. 5. In this case, the user's touch should be a touch-and-hold, which is a touch that is maintained. Here, the icon 20 enters a parameter setting mode. As will be described later, in response to parameter setting being complete, the icon 20 is switched to a moving mode so as to become movable.

In response to the user touching the one point, the icon 20 may preferably be displayed above the one point to be able to be viewed properly via the display unit 11. If the icon 20 is displayed on the left or right side of the one point or below the one point, the icon 20 may be hidden from view by the hand of the user when the user touches the one point. Also, the icon 20 may have a circular shape with a protruding tip at one side thereof, particularly, at a lower side thereof, so as to be able to precisely point to the one point being touched by the user.

The parameter input area 21 has a shape whose width gradually increases away from the one point where the icon 20 is formed, as illustrated in FIG. 5. If the width of the parameter input area 21 increases, it may suggest to the user that as a pan proceeds, a value being controlled increases. However, the present invention is not limited to this. The width of the parameter input area 21 may gradually decrease away from the one point or may be uniform, or the parameter input area 21 may have various other shapes with no particular pattern. Also, the parameter input area 21 may preferably be displayed to spiral clockwise from the one point where a waypoint is formed, but the present invention is not limited thereto. The parameter input area 21 may also be displayed to spiral counterclockwise from the one point or to draw a straight line directed to a particular direction, or may be displayed to be directed to various directions with no particular pattern.

That is, the parameter input area 21 may have various shapes as long as it can allow the value of a parameter to be adjusted as the user performs a pan from the one point where the icon is formed, while maintaining a touch or click.

In exemplary embodiments of the present invention, including the first exemplary embodiment, the user may select the one point by performing a long touch on the one point on the electronic map 111. That is, if the touch of the one point by the user's finger is maintained for more than a predetermined time, for example, 0.5 seconds, a selection of the one point may be completed. In this manner, a touch or pan unintentionally performed on the electronic map 111 by the user can be distinguished from a touch for selecting the one point on the electronic map 111, and as a result, misrecognition can be prevented.

As illustrated in FIG. 5, in response to the user touching and selecting the one point, the icon 20 may be displayed on the electronic map 111. Alternatively, the icon 20 may be displayed after the user performs parameter setting on the electronic map 111. Still alternatively, the icon 20 may be displayed even before the user touches the one point. In other words, the one point on the electronic map 111 may be selected by the user touching the one point on the electronic map 111, but in response to the user conducting a search for a name, an address, or a telephone number, the icon 20 may be selected as a result of the search.

Thus, the time when the icon 20 is displayed is not particularly limited, and the icon 20 may be displayed on the electronic map 111 at various points of time as long as the icon 20 is yet to be moved by the user to select the exact desired point.

Figure 6:
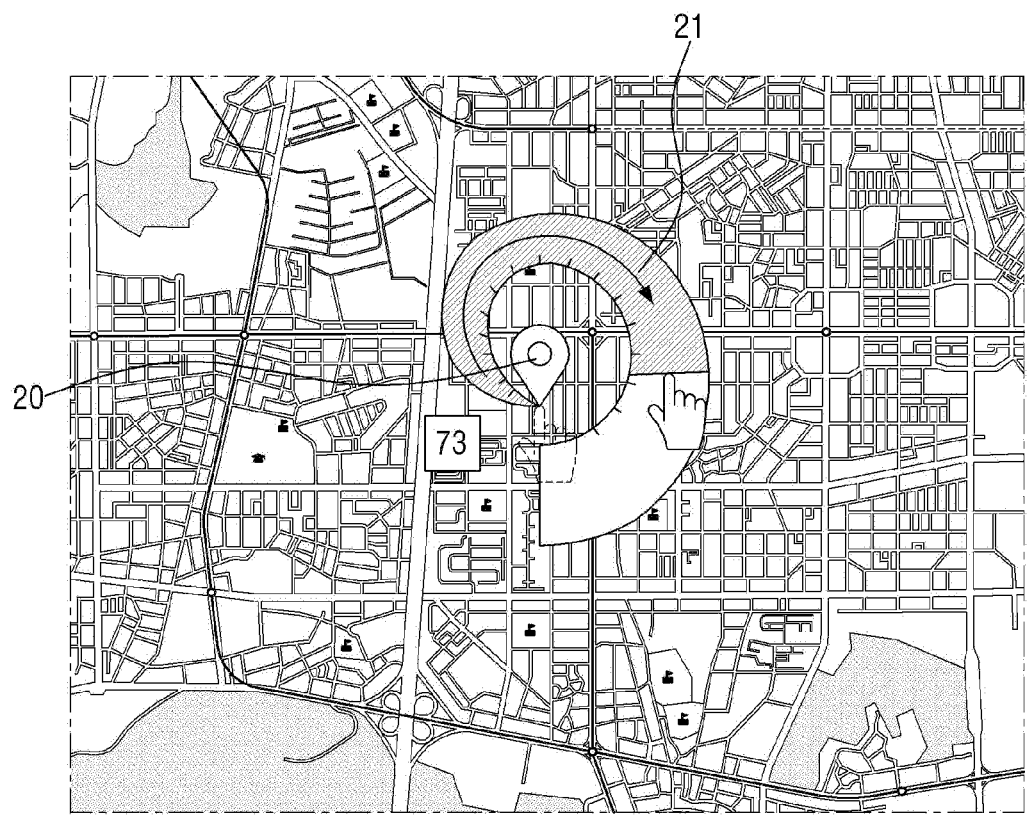
FIG. 6 is a view illustrating how to adjust the value of a parameter via the parameter input area according to the first exemplary embodiment.

FIG. 6 is a view illustrating how to adjust the value of a parameter via the parameter input area 21 according to the first exemplary embodiment.

A pan is a type of touch gesture and refers to the action of performing a touch on the display unit 11 and then performing a slide without releasing the touch. The direction or duration of the slide is not particularly limited, and the electronic device 1 recognizes, as a single pan, a gesture made between when a touch is performed and when the touch is released. A drag can be considered a type of pan gesture because it is used to move a particular object on a display. Generally, a gesture may be classified as a drag if it is for moving a particular object, but otherwise, it may be classified as a pan. If the electronic device 1 provides a touch function, the user may touch the one point using a finger or the like. Then, the user may perform a slide from the one point to another point while maintaining the touch made with the finger or the like. If the user can input a command to the electronic device 1 via a mouse, the user may click a button of the mouse first. Then, the user may perform a drag from the one point to another point while keeping pressing the button of the mouse. According to the present invention, the user performs a touch on the one point on the electronic map 111, adjusts the value of a parameter to set the parameter, and moves the icon 20 to the desired point, thereby setting a waypoint for the moving object 2. These processes are performed by maintaining a touch or click, instead of releasing it. A gesture for adjusting the value of a parameter will hereinafter be referred to as a pan, and a gesture for moving the icon 20 to the desired point will hereinafter be referred to as a drag. This, however, is simply for classifying the gesture for moving a particular object, i.e., the icon 20 and does not necessarily mean that a drag is performed after performing a pan and releasing a touch. Since in the case of using a mouse, no gestures are supposed to be input, the gesture for adjusting the value of a parameter and the gesture for moving the icon 20 to the desired point may both be referred to as drags.

In order to adjust the value of a parameter, the user performs a touch on the one point with a finger or the like or performs a click on the one point with a mouse or the like, as illustrated in FIG. 6. Thereafter, the user performs a pan along a direction in which the parameter input area 21 is formed (S403). Thereafter, the electronic device 1 detects the pan. Then, as illustrated in FIG. 6, the gauge in the parameter input area 21 is raised, and the value of a parameter corresponding to the gauge is adjusted accordingly. The adjusted value may be displayed near the parameter input area 21. Accordingly, the user can view and precisely adjust the value of the parameter.

If the gauge of the parameter is raised beyond a value desired by the user, the user may perform a pan along a direction opposite to the direction in which the parameter input area 21 is formed. Then, the gauge in the parameter input area 21 is lowered, and the value of the parameter corresponding to the gauge is adjusted accordingly.

Figure 7:
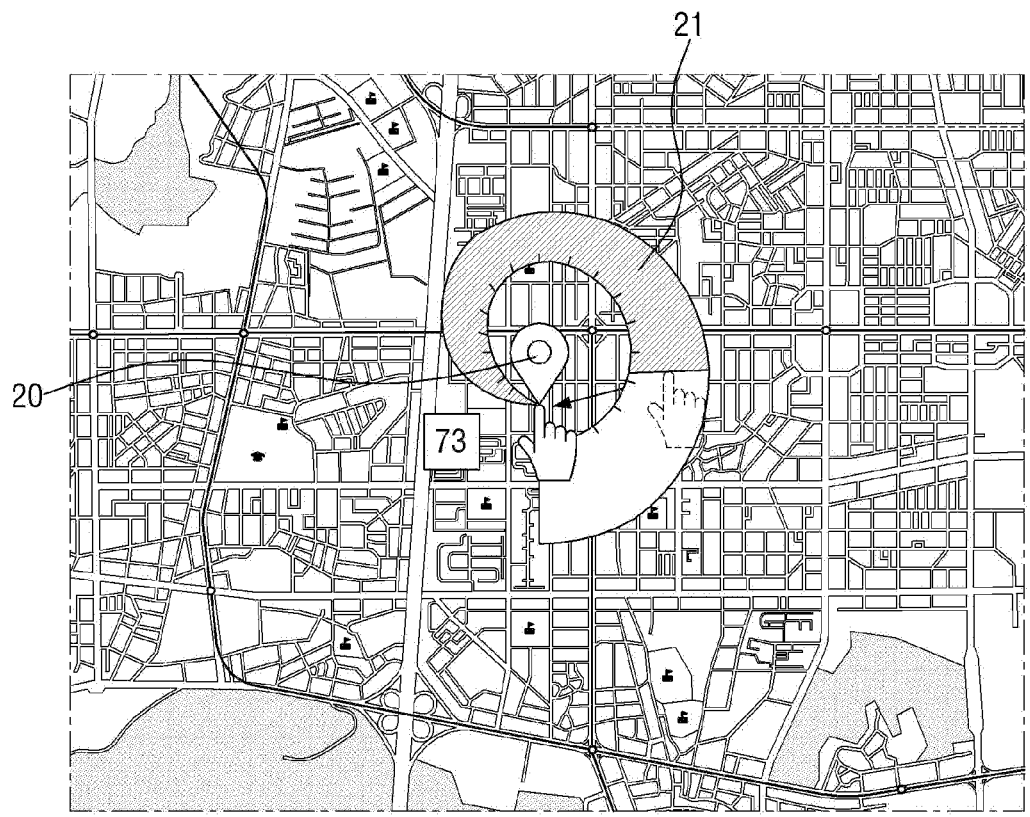
FIG. 7 is a view illustrating how to set the parameter to the value adjusted by the operation of FIG. 6.

FIG. 7 is a view illustrating how to set a parameter to a value adjusted by the operation of FIG. 6.

If the value of a parameter is adjusted to a value desired by the user, the user may perform a pan toward the one point (S405), as illustrated in FIG. 7, to set the parameter to the adjusted value (S404). Due to, for example, the contact area of a finger, it is very difficult to return to the one point from a point being touched by the user without any error. Thus, in order to reflect the user's intention of setting the parameter, there is a need to additionally define a virtual return area near the one point that is initially selected. That is, if the user performs a pan to return to the range of the return area, the electronic device 1 sets the parameter to the adjusted value. That is, even if the user fails to return to the one point without any error, the electronic device 1 can identify the user's intention of setting the parameter. Here, a touch made by a finger or the like needs to be maintained from when the one point is selected to when the value of the parameter is set. The return area may not be displayed via the display unit 11 or may be displayed. Also, the size of the return area may vary for the convenience of the user. That is, in order for the electronic device 1 to operate sensitively, the return area may be set to be relatively wide, and in order for the electronic device 1 to operate less sensitively, the return area may be set to be relatively narrow.

In response to the user's touch point in the parameter input area 21 entering the return area and a predetermined amount of time elapsing after the setting of the parameter is complete, the icon 20 displayed at the one point may be switched to the moving mode and may thus become movable (S406) in order that the exact desired point can be precisely selected. The predetermined amount of time is preferably about 0.5 seconds to 1 second, but the present invention is not limited thereto. The icon 20 switched to the moving mode is preferably displayed in a different shape or color to be distinguished from the icon 20 in the parameter setting mode.

Although not specifically illustrated, the icon 20 switched to the moving mode is moved along with a finger when the user maintains a touch made with the finger and drags the finger. That is, the user can move the icon 20 with his/her finger. Accordingly, in order to set the desired point as a waypoint, the user maintains the touch made with the finger and drags the icon 20 toward the desired point (S407). As a modification, when the predetermined amount of time elapses after the touch made with the finger enters the return area, the icon 20 may be fixed, but the electronic map 111 may be activated to become movable. In this case, the user can move the electronic map 111 relatively such that the fixed icon 20 can point to the desired point. Meanwhile, once the icon 20 is switched to the moving mode, the parameter input area 21 may disappear because the value of the parameter no longer needs to be adjusted.

If the value desired by the user is an initially-set default value, the user does not need to perform a pan using the parameter input area 21. At this time, the icon 20 can be readily switched to the moving mode when the predetermined time elapses after the user selects the one point and maintains the touch. Also, when the predetermined amount of time elapses after the icon 20 is switched to the moving mode and the user maintains the touch without moving it, the icon 20 may be switched back to the parameter setting mode.

When the drag of the icon 20 switched to the moving mode is complete so that the protruding tip of the icon 20 points to the desired point, the user releases the touch (S408), thereby setting the desired point as a waypoint (S409).

Figure 8:
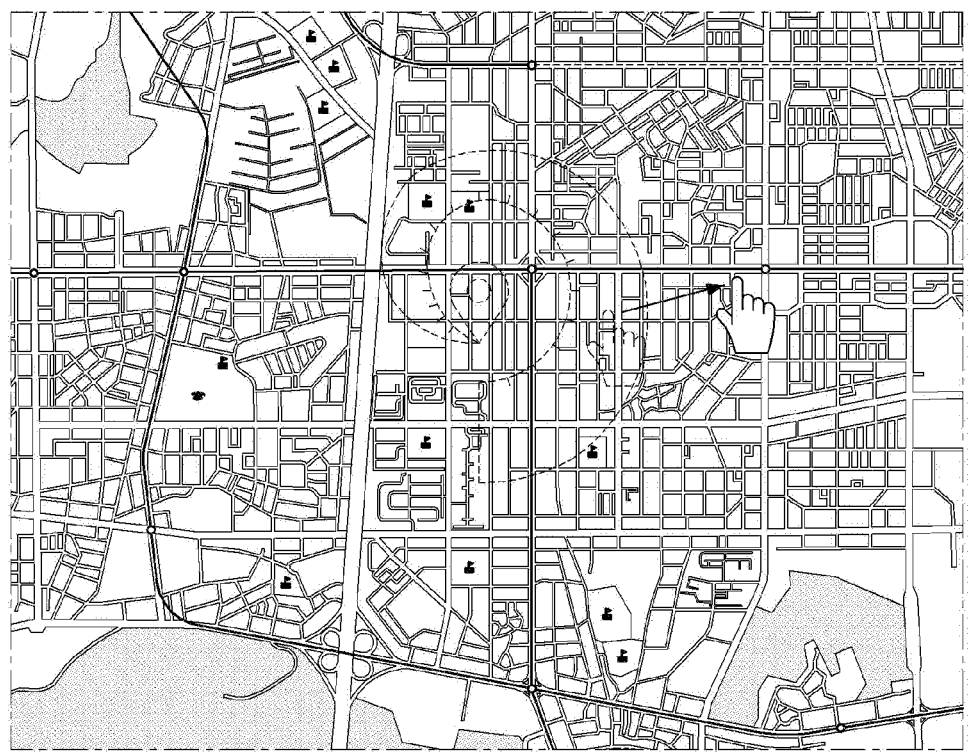
FIG. 8 is a view illustrating how to cancel the selection of the one point as performed in the operation of FIG. 4.

FIG. 8 is a view illustrating how to cancel the selection of the one point as performed in the operation of FIG. 4.

Meanwhile, the one point selected at an initial phase by the user may be considerably spaced apart from the desired point to be set as a waypoint. In this case, the selection of the one point needs to be canceled. If the value of a parameter is already adjusted, the user may perform a pan in a direction away from the one point (S410), as illustrated in FIG. 8. If the value of the parameter is yet to be adjusted, the user already touches the one point and thus performs a pan toward a region where the parameter input area 21 is not formed. As a result, the selection of the one point may be cancelled (S411).

Figure 9A:
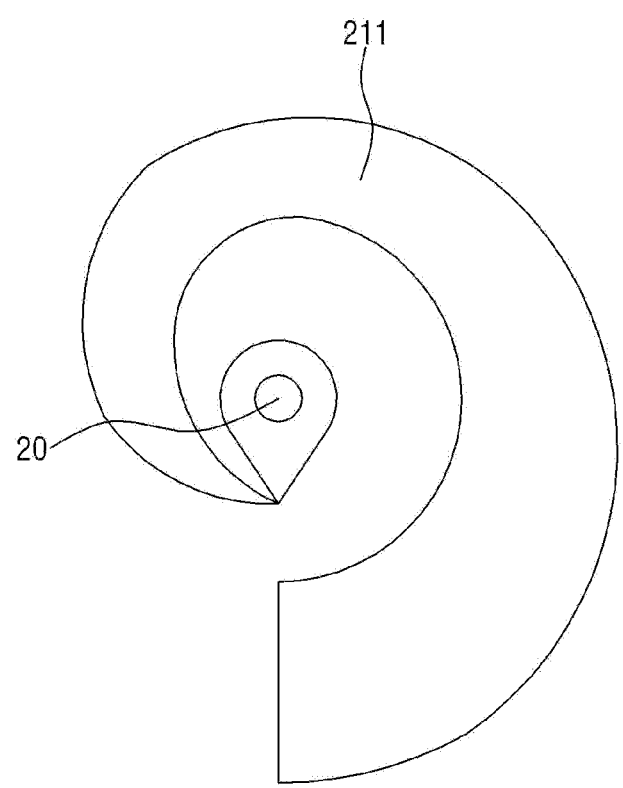
FIG. 9A is a view illustrating a parameter input area according to the first exemplary embodiment that can be formed when there is a single parameter to be set.
Figure 9B:
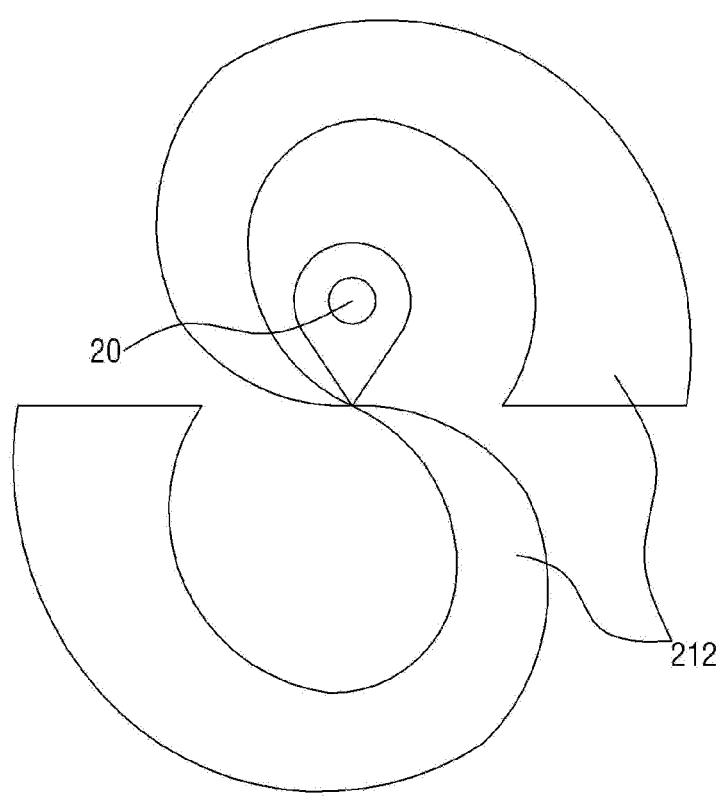
FIG. 9B is a view illustrating a parameter input area according to the first exemplary embodiment that can be formed when there are two parameters to be set.
Figure 9C:
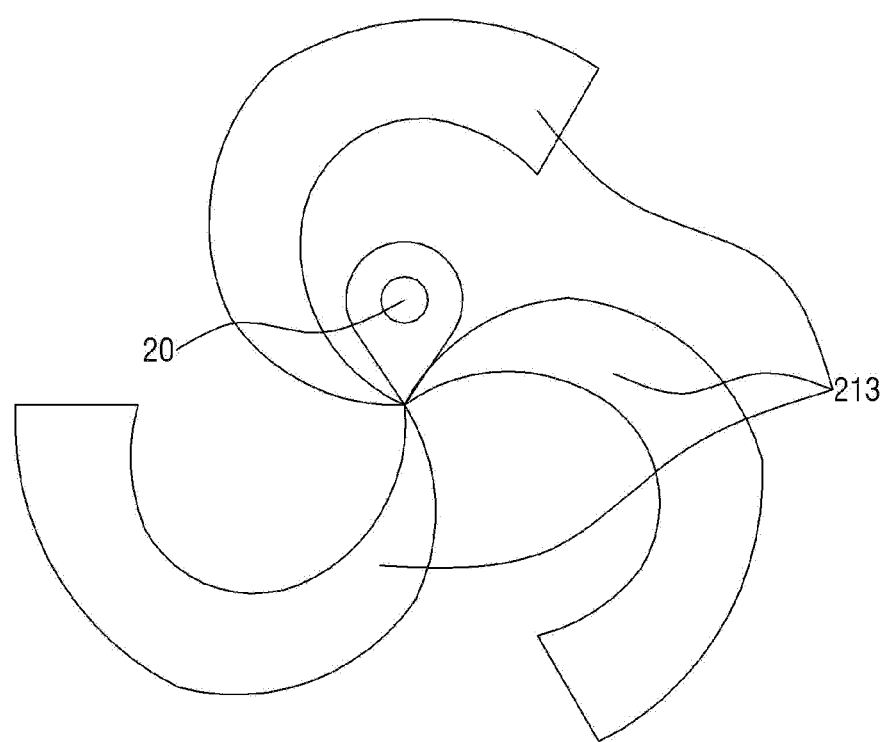
FIG. 9C is a view illustrating a parameter input area according to the first exemplary embodiment that can be formed when there are three parameters to be set.

FIG. 9A is a view illustrating a parameter input area 21 according to the first exemplary embodiment that can be formed when there is a single parameter to be set, FIG. 9B is a view illustrating a parameter input area 21 according to the first exemplary embodiment that can be formed when there are two parameters to be set, and FIG. 9C is a view illustrating a parameter input area 21 according to the first exemplary embodiment that can be formed when there are three parameters to be set.

A case where there is only one parameter to be set has been described above with reference to FIGS. 5 through 8. In this case, the parameter input area 21 is formed to include only one region 211, as illustrated in FIG. 9A. On the other hand, when there are multiple parameters to be set, the parameter input area 21 may be formed to include multiple regions. In this case, the number of regions of the parameter input area 21 corresponds to the number of parameters to be set. That is, when there are two parameters to be set, as illustrated in FIG. 9B, the parameter input area 21 are formed to include two regions 212, and when there are three parameters to be set, as illustrated in FIG. 9C, the parameter input area 21 are formed to include three regions 213.

When there are multiple parameters to be set, the user may set each of the multiple parameters by sequentially performing a pan on each of the regions of the parameter input area 21. That is, when setting a first parameter, the user may adjust the value of the first parameter by performing a pan on a first region of the parameter input area 21 corresponding to the first parameter in a direction in which the first region is formed. Then, in order to set the first parameter to the adjusted value, the user may perform a pan to enter the return area. These processes may be repeatedly performed on other regions of the parameter input area 21. At this time, the touch made by the finger or the like needs to be maintained from when the one point is selected to when the setting of all parameters is complete.

Once the setting of the first parameter is complete, the first region of the parameter input area 21 corresponding to the first parameter may be displayed in a different shape or color to be distinguished from the second region of the parameter input area 21 corresponding to a second parameter that is yet to be set.

Figure 10:
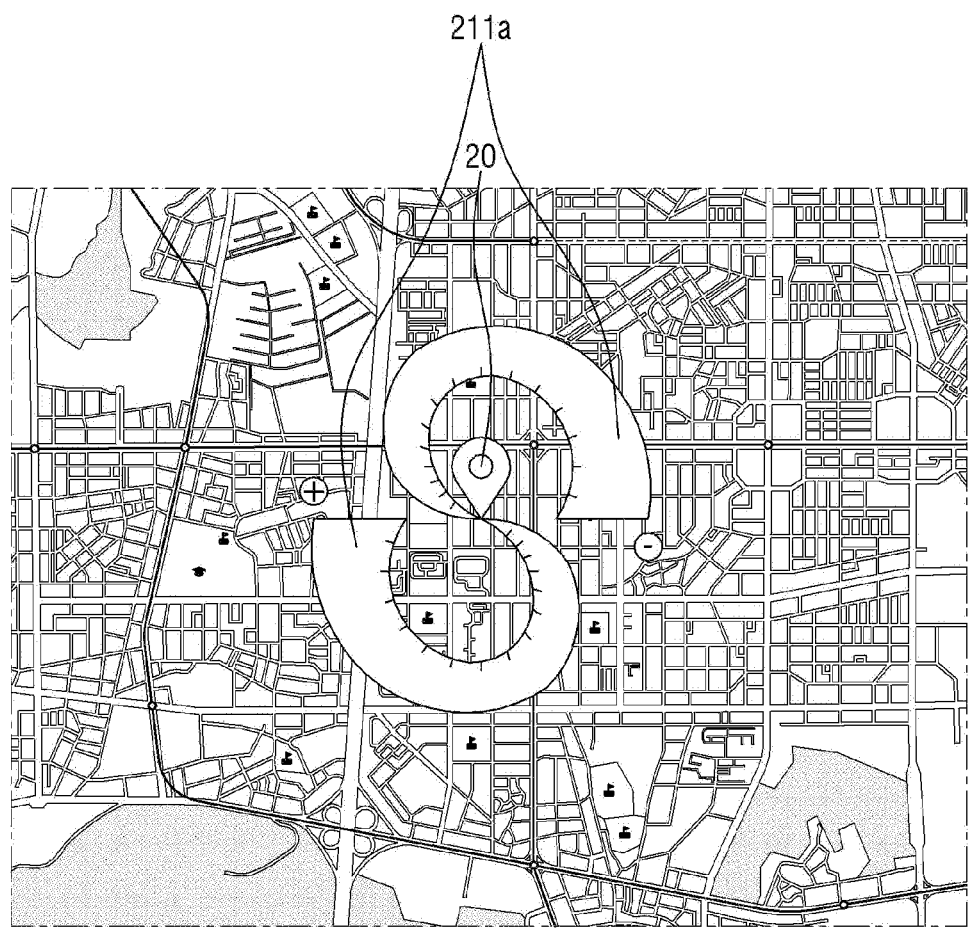
FIG. 10 is a view illustrating a parameter input area according to the first exemplary embodiment that can be formed when a parameter to be set can have both positive and negative values.

FIG. 10 is a view illustrating a parameter input area comprising two regions 211a according to the first exemplary embodiment that can be formed when a parameter to be set can have both positive and negative values.

In the examples described above with reference to FIGS. 5 through 8, a parameter to be set may have only positive values. However, the parameter to be set may have both positive and negative values. For example, the parameter to be set may be the rate of enlargement or reduction of the electronic map 111 currently being displayed on the display unit 11. In this example, the parameter to be set can be adjusted to a positive or negative value. Accordingly, the parameter input area 21 may be formed to include two regions 211a, as illustrated in FIG. 10. However, since the regions 211a and the regions 212 of FIG. 9B are the same in shape, the user may be confused about whether there are two parameters to be set or there is a single parameter to be set, but the single parameter can have both positive and negative values. Thus, as illustrated in FIG. 10, symbols "+" and "−" may also be displayed to indicate whether the parameter to be set via the regions 211a can be set to a positive or negative value.

Figure 11:
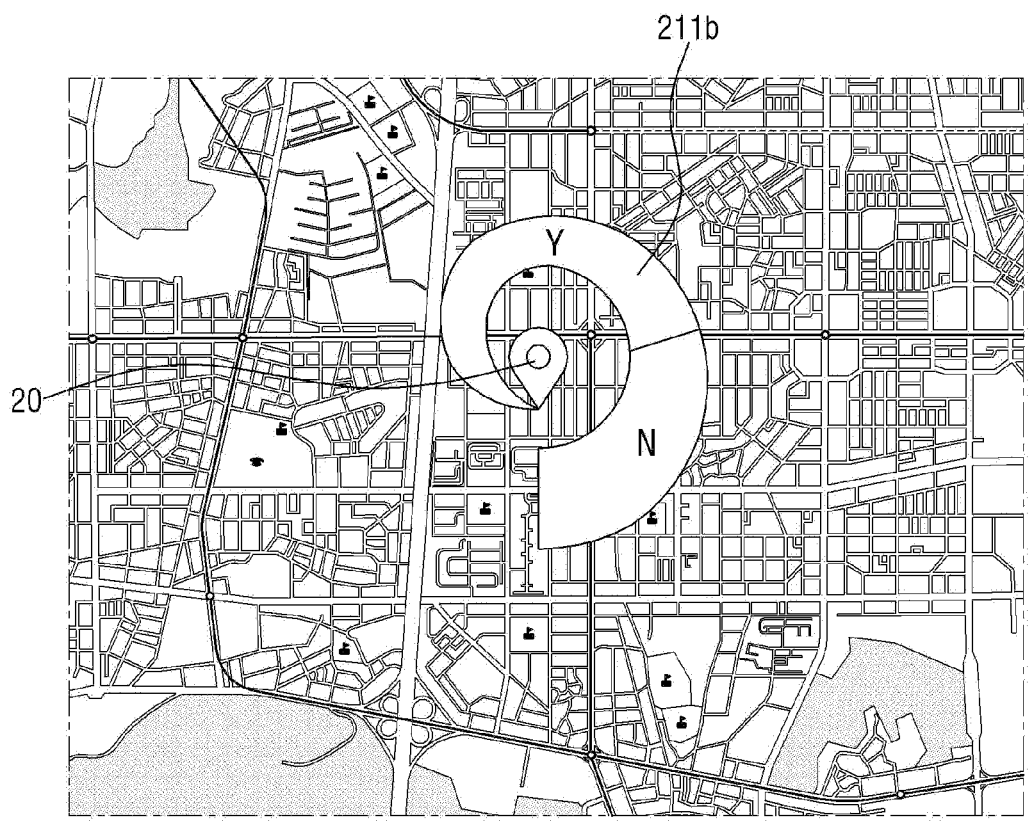
FIG. 11 is a view illustrating a parameter input area according to a modification of the first exemplary embodiment that can be formed for a parameter to be set with a toggle.
Figure 12:
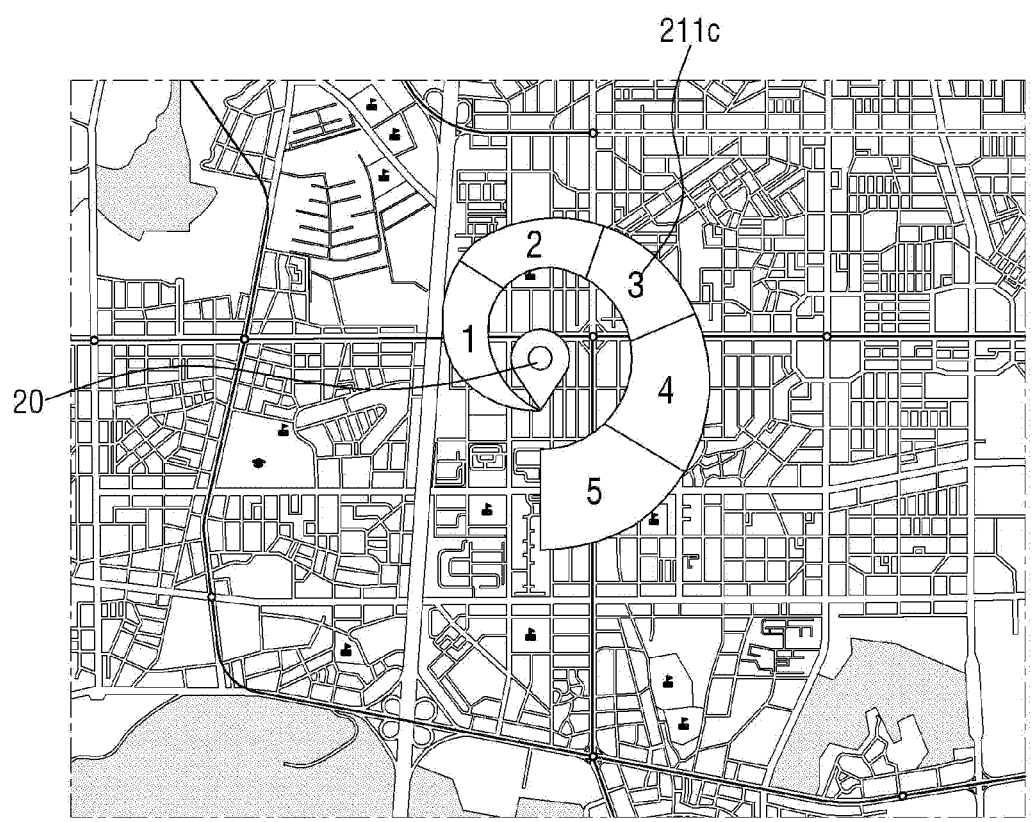
FIG. 12 is a view illustrating a parameter input area according to another modification of the first exemplary embodiment that can be formed for a parameter to be set to a level.

FIG. 11 is a view illustrating a parameter input area 211b according to a modification of the first exemplary embodiment that can be formed for a parameter to be set with a toggle, and FIG. 12 is a view illustrating a parameter input area 211c according to another modification of the first exemplary embodiment that can be formed for a parameter to be set to a level.

A case where each parameter can be set to a value has been described above with reference to FIGS. 5 through 9. In this case, if the user performs a pan on the parameter input area 21, the gauge may be raised or lowered.

However, there may be a case where a parameter needs to be set with a toggle. For example, there may be a case where a determination needs to be made as to whether the unmanned moving object 2 is to hover at a waypoint. In this case, options such yes or no need to be selected, instead of adjusting the value of a parameter. Thus, as illustrated in FIG. 11, the parameter input area 211b is divided into two sub-regions, i.e., first and second sub-regions, and the first and second sub-regions may display yes and no, respectively.

On the other hand, there may be a case where a parameter needs to be set to a level. For example, a parameter such as the height or speed of the unmanned moving object 2 can be set to a value, but there is a case where predetermined values are designated in advance as levels that a parameter can be set to. In this case, one of the levels needs to be selected. Thus, as illustrated in FIG. 12, the parameter input area 211c may be divided into multiple sub-regions, i.e., first, second, and third sub-regions, and the first, second, and third sub-regions may represent first, second, and third levels, respectively.

Each parameter needs to be set in any particular manner such as a value setting manner, a toggle setting manner, or a level setting manner. However, if the user does not set each parameter in any particular manner and if there is no default setting, the icon 20 may not be switched to the moving mode or may not be set as a waypoint. On the other hand, if there is a default setting, each parameter may be set according to the default setting.

Figure 13:
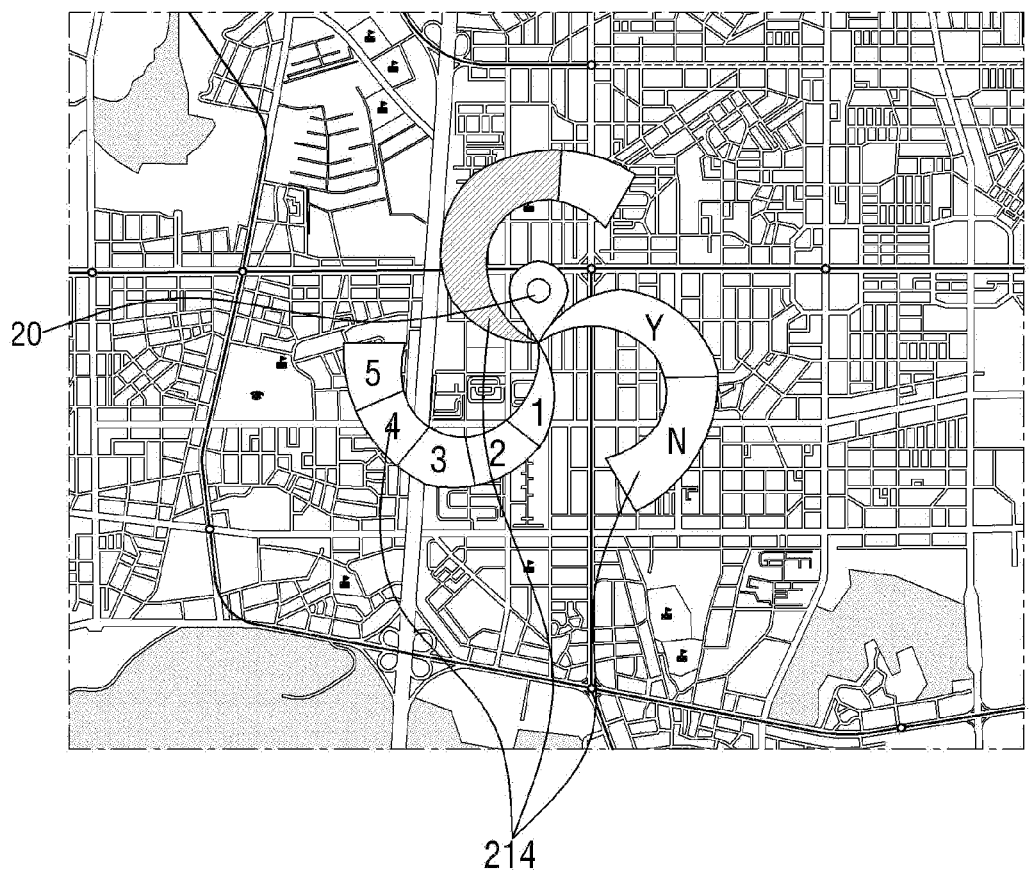
FIG. 13 is a view illustrating a parameter input area according to another modification of the first exemplary embodiment that can be formed when there are multiple parameters to be set and each of the parameters needs to be set in a value setting, toggle setting, or level setting manner.

FIG. 13 is a view illustrating a parameter input area 214 according to another modification of the first exemplary embodiment that can be formed when there are multiple parameters to be set and each of the parameters needs to be set in a value setting, toggle setting, or level setting manner.

When there are multiple parameters to be set, each of the parameters can be set independently. Thus, some parameters can be set in a value setting manner, some parameters can be set in a toggle setting manner, or some parameters can be set in a level setting manner. In this case, the parameter input area 214 may be formed to include a number of regions corresponding to the number of parameters to be set. As illustrated in FIG. 13, the regions of the parameter input area 214 may be displayed to allow a gauge to be adjusted for parameters that need to be set in a value setting manner, to allow a yes or no option to be selected for parameters that need to be set in a toggle setting manner, and to allow a particular level to be selected for parameters that need to be set in a level setting manner. Then, the user can set each parameter by sequentially performing a pan on each of the regions of the parameter input area 214. At this time, a touch made by a finger or the like needs to be maintained from when the one point is selected to when the setting of all parameters is complete and the desired point is set as a waypoint. Accordingly, the inconvenience of repeating multiple touches and touch cancellations on the display unit 11 to set each parameter can be reduced.

Figure 14:
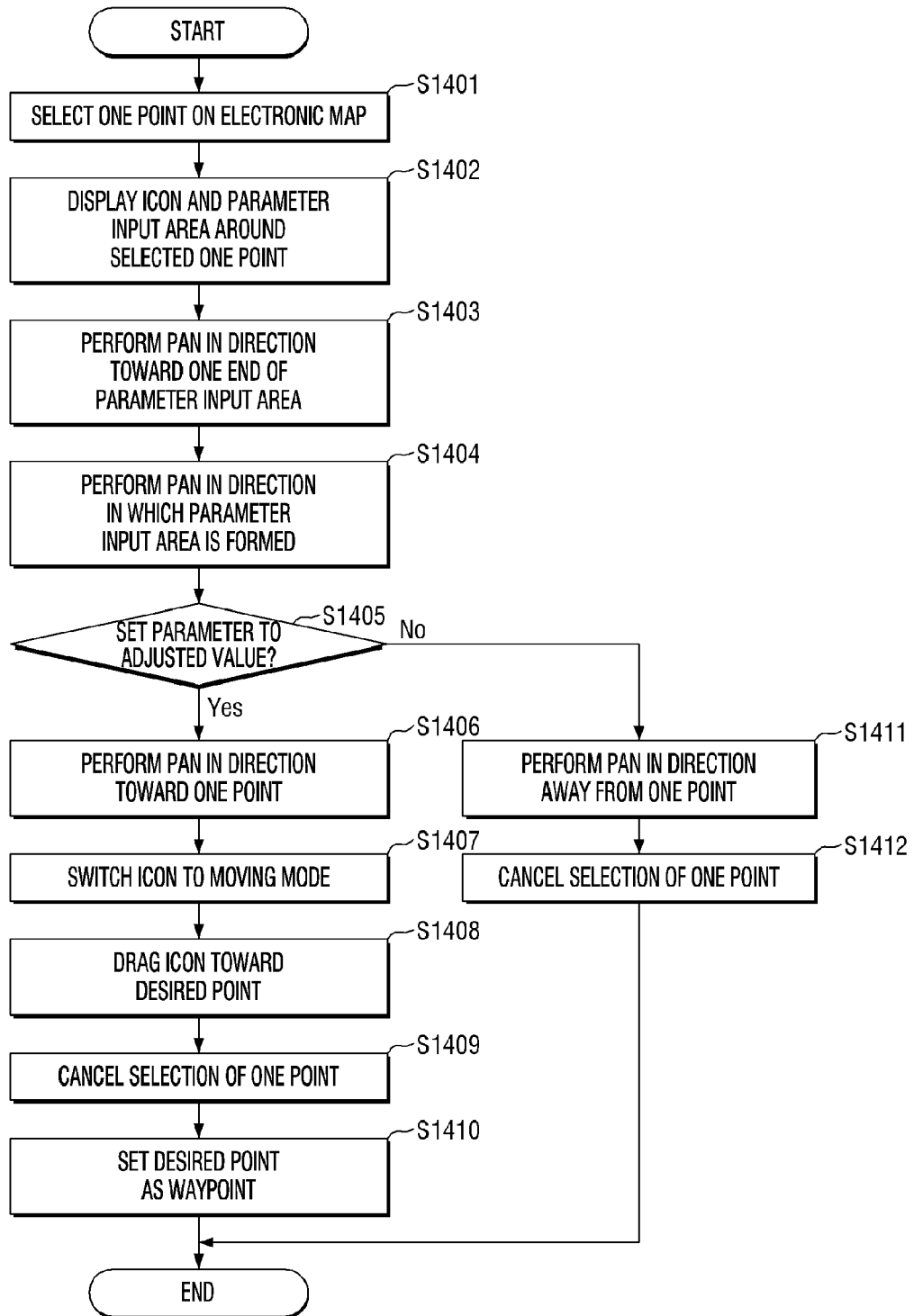
FIG. 14 is a flowchart illustrating a parameter setting method according to a second exemplary embodiment of the present invention.

FIG. 14 is a flowchart illustrating a parameter setting method according to a second exemplary embodiment of the present invention.

Figure 15:
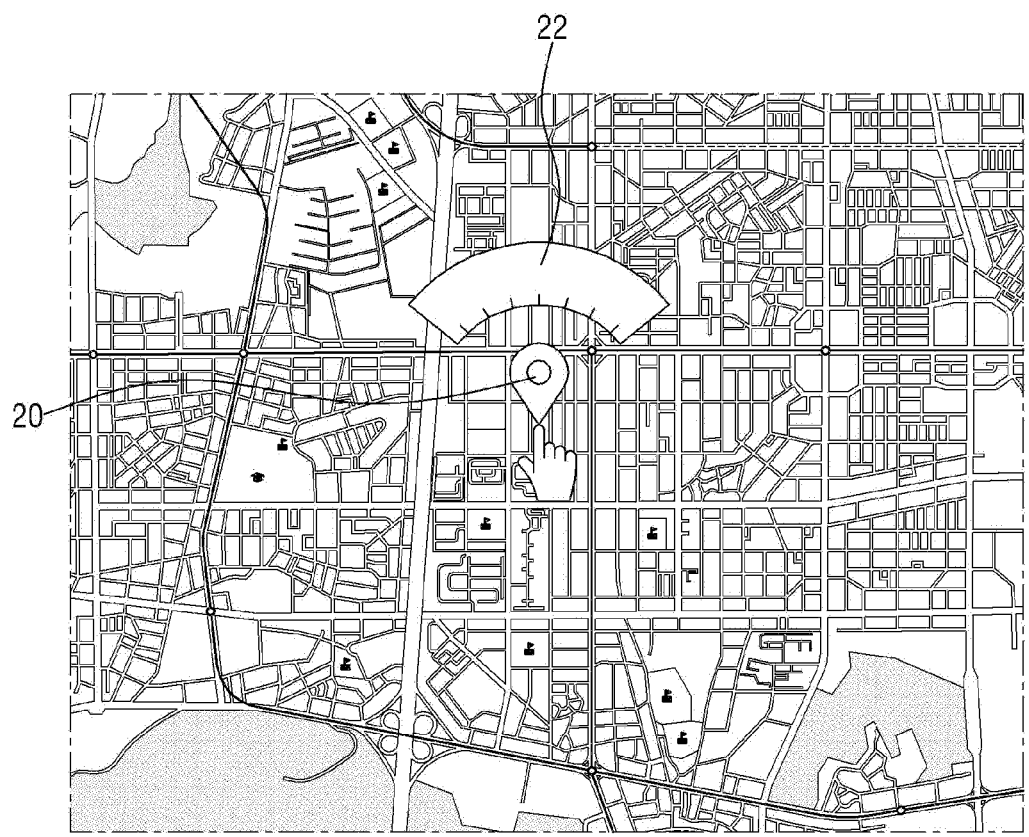
FIG. 15 is a view illustrating a waypoint and a parameter input area according to the second exemplary embodiment that can be formed on the electronic map as a result of the operation of FIG. 3.

In the parameter setting method according to the second exemplary embodiment, as illustrated in FIG. 15, a parameter input area 22 according to the second exemplary embodiment is not connected to one point. Thus, in the second exemplary embodiment, unlike in the first exemplary embodiment, the user is required to select one point and then to perform a pan to move to the parameter input area 22 to adjust the value of a parameter. Each step in the flowchart of FIG. 14 will hereinafter be described with reference to FIGS. 15 through 18. Specifically, the second exemplary embodiment will hereinafter be described, focusing mainly on differences with the first exemplary embodiment and omitting any redundant descriptions.

FIG. 15 is a view illustrating a waypoint and a parameter input area 22 according to the second exemplary embodiment that can be formed on the electronic map 111 as a result of the operation of FIG. 3.

Referring again to FIG. 3, in response to the user performing a touch on one point on the electronic map 111 (S1401), an icon 20 is displayed at the one point, and at the same time, the parameter input area 22 is displayed (S1402), as illustrated in FIG. 15.

The parameter input area 22 is a predetermined distance apart from the one point where the icon 20 is formed. The predetermined distance may be uniform so that the parameter input area 22 can draw an arc around the one point, and the width of the parameter input area 22 may be uniform in a direction in which the parameter input area 22 is formed. As a result, as illustrated in FIG. 14, the parameter input area 22 may be in the shape of a part of a ring. However, the present invention is not limited to this. Alternatively, the predetermined distance may gradually increase or decrease, and the width of the parameter input area 22 may increase or decrease along the direction in which the parameter input area 22 is formed. Alternatively, the parameter input area 22 may have various shapes with no particular pattern.

That is, the parameter input area 22 may have various shapes as long as it is spaced apart from the one point where a waypoint is set and can allow the user to perform a pan while maintaining a touch or click and thus to adjust the value of a parameter.

Figure 16:
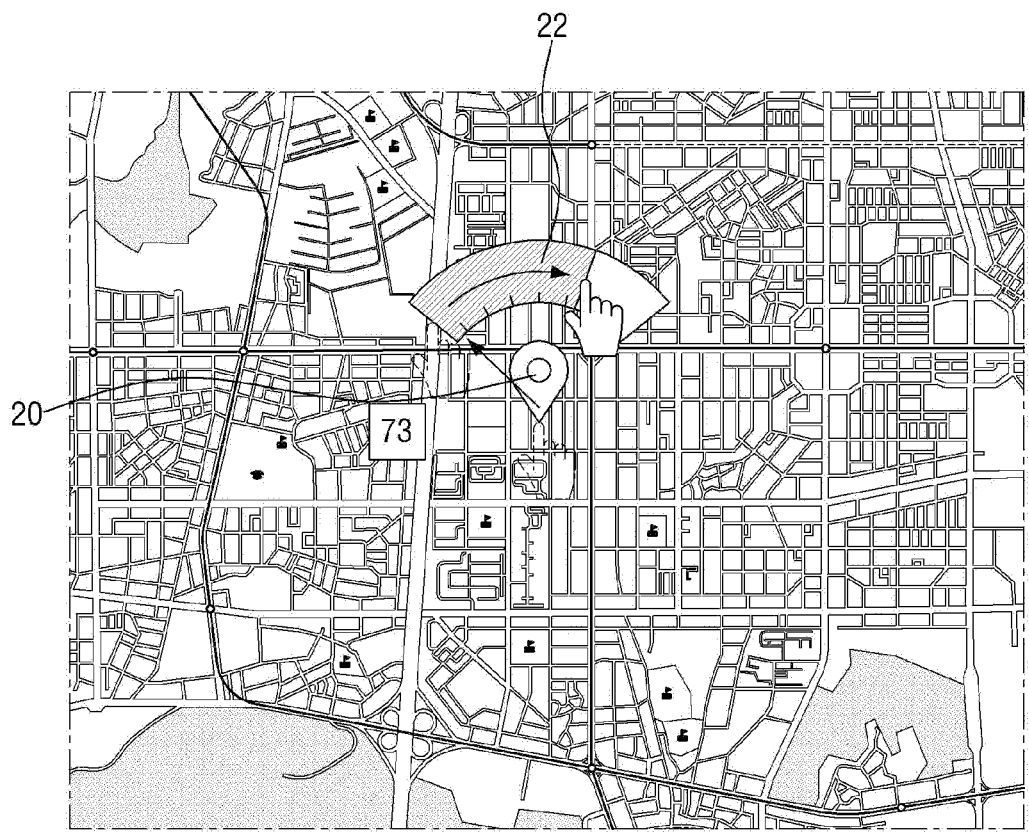
FIG. 16 is a view illustrating how to control the value of a parameter via the parameter input area according to the second exemplary embodiment.

FIG. 16 is a view illustrating how to control the value of a parameter via the parameter input area 22 according to the second exemplary embodiment.

Referring to FIG. 16, in order for the user to adjust the value of a parameter, the user performs a touch on the one point with a finger or the like. Thereafter, the user performs a pan in a direction toward a first end of the parameter input area 22 (S1403). The first end of the parameter input area 22 may be the left end of the parameter input area 22, but the present invention is not limited thereto. Alternatively, the first end of the parameter input area 22 may be the right end of the parameter input area 22 or various other parts of the parameter input area 22 such as the upper or lower end of the parameter input area 22.

The user's touch enters the vicinity of the left end of the parameter input area 22, and to adjust the value of a parameter, the user performs a pan from the left end to the right end of the parameter input area 22 along the direction in which the parameter input area 22 is formed (S1404). Then, the electronic device 1 detects the pan operation, and as illustrated in FIG. 16, the gauge in the parameter input area 22 is raised so that the value of a parameter corresponding to the gauge is adjusted. Then, the adjusted value may be displayed near the parameter input area 22.

In response to the user performing a pan along a direction opposite to the direction in which the parameter input area 22 is formed, the gauge in the parameter input area 22 is lowered, and the value of the parameter corresponding to the gauge is adjusted accordingly.

Figure 17:
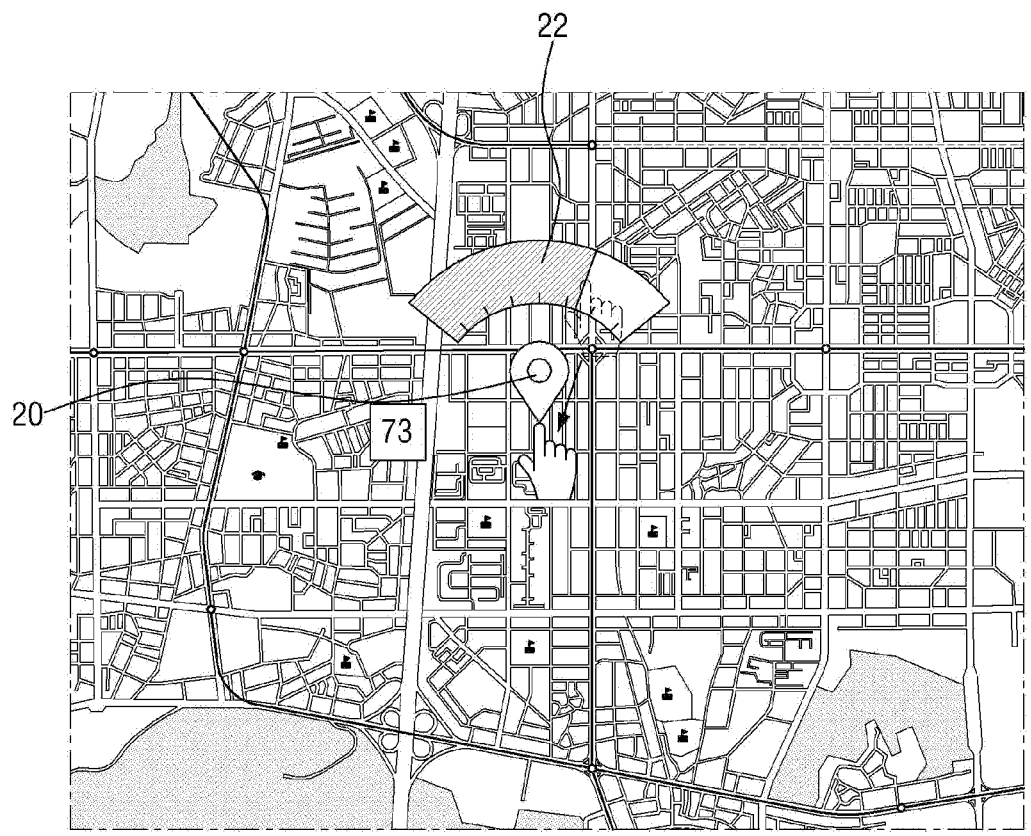
FIG. 17 is a view illustrating how to set the parameter to the value adjusted by the operation of FIG. 16.

FIG. 17 is a view illustrating how to set the parameter to the value adjusted by the operation of FIG. 16.

If the value of the parameter is adjusted to a value desired by the user, the user may perform a pan toward the one point (S1406), as illustrated in FIG. 17, to set the parameter to the adjusted value (S1405). At this time, the touch made by the finger or the like needs to be maintained from when the one point is selected to when the setting of the parameter is complete.

In response to the touch point in the parameter input area 22 entering the return area and a predetermined amount of time elapsing after parameter setting is complete, the icon 20 displayed at the one point may be switched to a moving mode and may thus become movable (S1407) in order that an exact desired point can be precisely selected.

Although not specifically illustrated, the user drags the icon 20 toward the desired point while maintaining the touch made with the finger (S1408) in order to set the desired point as a waypoint. In response to the drag of the icon 20, which is switched to the moving mode, being complete so that the protruding tip of the icon 20 can point to the desired point, the user cancels the touch (S1409), thereby setting the desired point as a waypoint (S1410).

Figure 18:
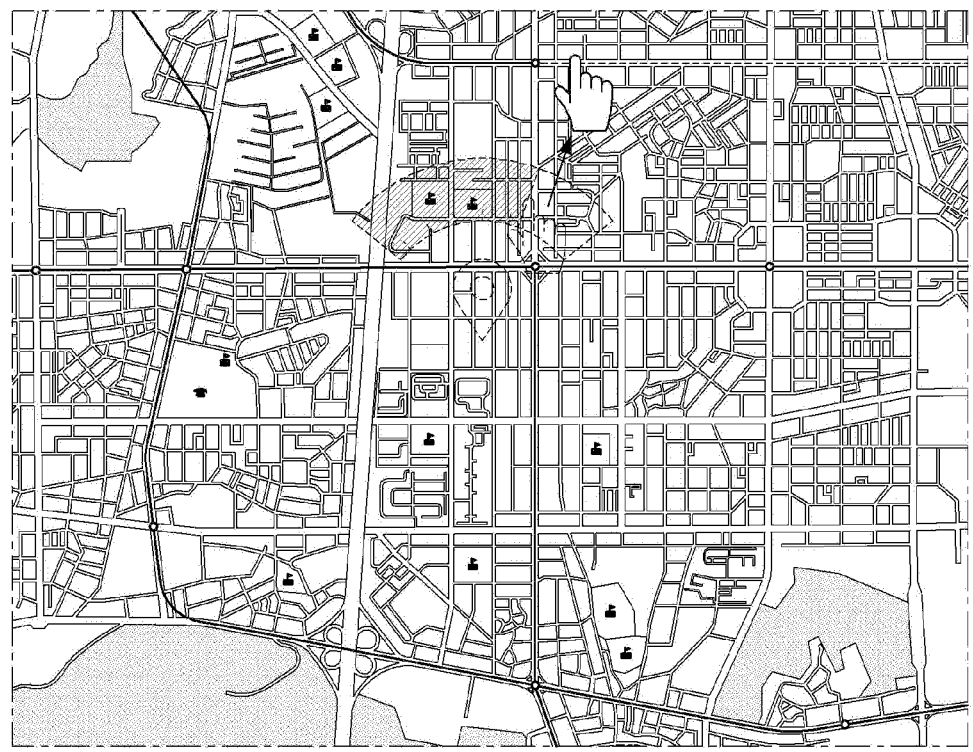
FIG. 18 is a view illustrating how to cancel the selection of the one point as performed in the operation of FIG. 15.

FIG. 18 is a view illustrating how to cancel the selection of the one point as performed in the operation of FIG. 15.

When there is a need to cancel the selection of the one point, the user may perform a pan in a direction away from the one point (S1411), as illustrated in FIG. 18. If the value of the parameter is yet to be adjusted, the user already touches the one point and thus performs a pan toward a region where the parameter input area 22 is not formed. As a result, the selection of the one point may be cancelled (S1412).

Figure 19A:
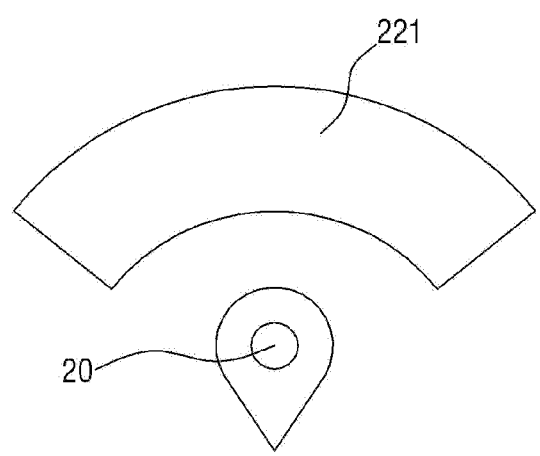
FIG. 19A is a view illustrating a parameter input area according to the second exemplary embodiment that can be formed when there is a single parameter to be set.
Figure 19B:
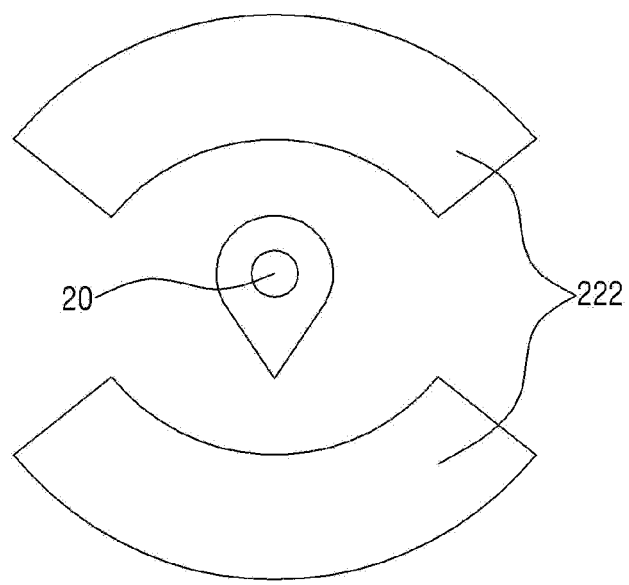
FIG. 19B is a view illustrating a parameter input area according to the second exemplary embodiment that can be formed when there are two parameters to be set.
Figure 19C:
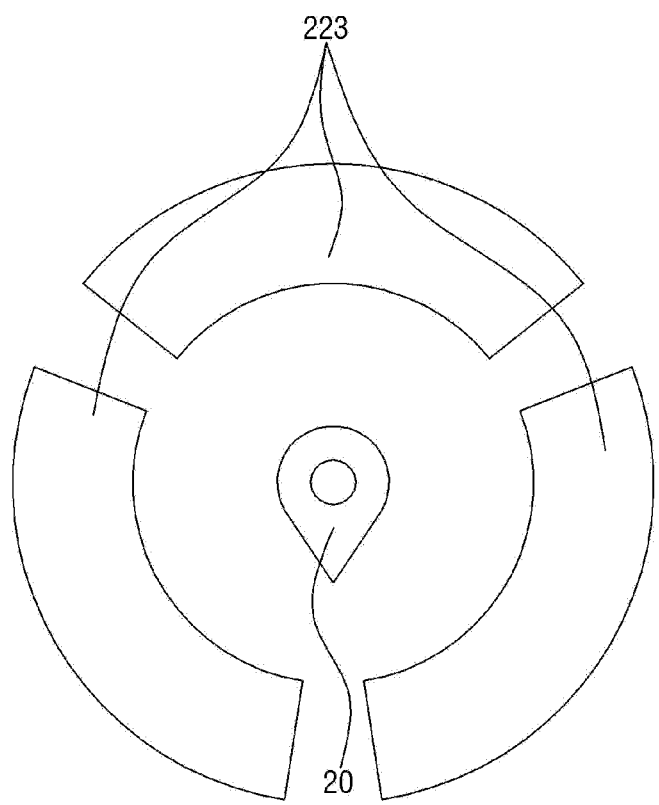
FIG. 19C is a view illustrating a parameter input area according to the second exemplary embodiment that can be formed when there are three parameters to be set.

FIG. 19A is a view illustrating a parameter input area 22 according to the second exemplary embodiment that can be formed when there is a single parameter to be set, FIG. 19B is a view illustrating a parameter input area 22 according to the second exemplary embodiment that can be formed when there are two parameters to be set, and FIG. 19C is a view illustrating a parameter input area 22 according to the second exemplary embodiment that can be formed when there are three parameters to be set.

When there is a single parameter to be set, the parameter input area 22 is formed to include a single region 221, as illustrated in FIG. 19A. On the other hand, when there are multiple parameters to be set, the parameter input area 22 may be formed to include multiple regions. In this case, the number of regions of the parameter input area 22 corresponds to the number of parameters to be set. That is, when there are two parameters to be set, as illustrated in FIG. 19B, the parameter input area 22 are formed to include two regions 222, and when there are three parameters to be set, as illustrated in FIG. 19C, the parameter input area 22 are formed to include three regions 223.

When there are multiple parameters to be set, the user may set each of the multiple parameters by sequentially performing a pan on each of the regions of the parameter input area 21. At this time, the touch made by the finger or the like needs to be maintained from when the one point is selected to when the setting of all parameters is complete.

Figure 20:
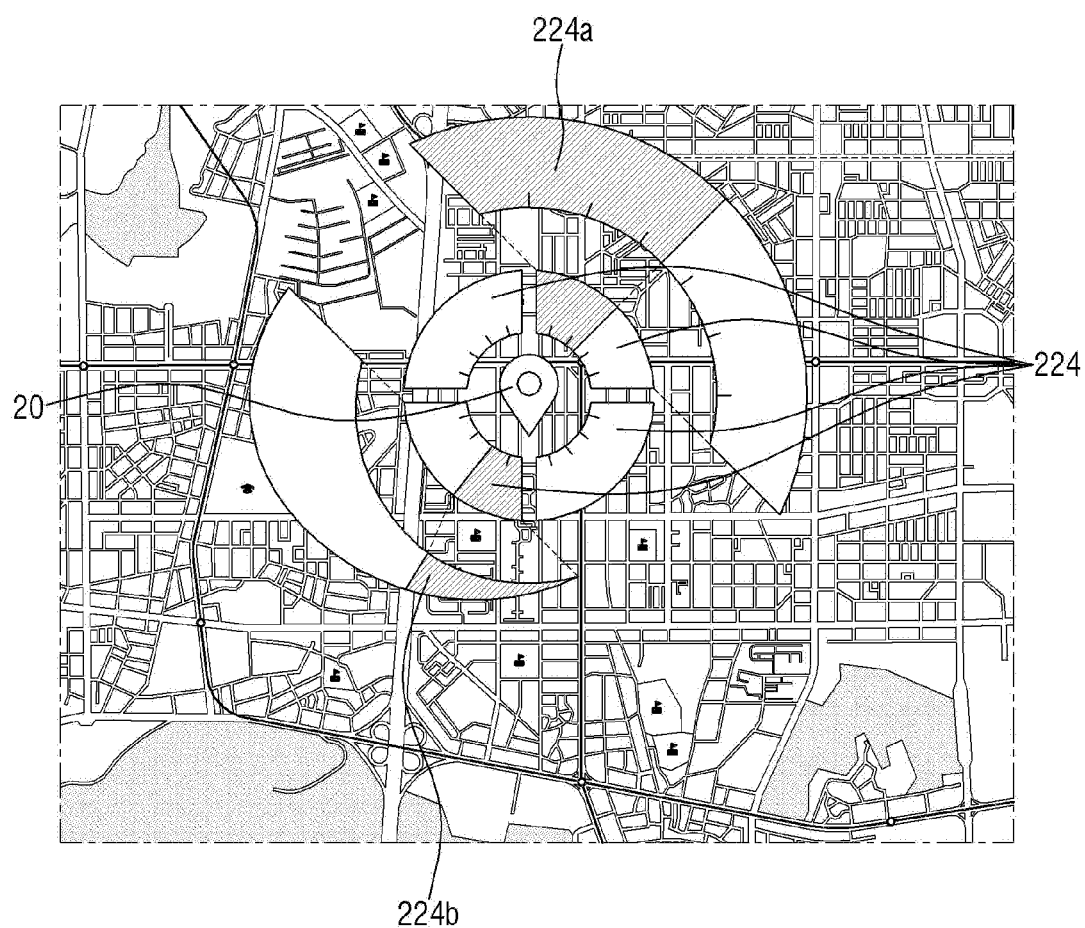
FIG. 20 is a view illustrating how to enlarge the parameter input area according to the second exemplary embodiment.

FIG. 20 is a view illustrating how to enlarge the parameter input area 22 according to the second exemplary embodiment.

When there are many parameters to be set, the size of the regions of the parameter input area 22 may be very narrow. Regardless of the number of parameters to be set, the user may have a very poor vision. In this case, it may be very difficult for the user to precisely adjust the value of each parameter using the parameter input area 22. Thus, as illustrated in FIG. 20, if the user maintains a touch on the parameter input area 22 for more than a predetermined amount of time, the entire parameter input area 22 or a part of the parameter input area 22 may be enlarged.

Enlarged parts 224 of the parameter input area 22 may be displayed outside, or over, the parameter input area 22 yet to be enlarged from the one point. That is, the enlarged parts may be displayed in various manners as long as it can show an association with the parameter input area yet to be enlarged.

The enlarged parts 224 are formed at a predetermined distance from the one point where the icon 20 is formed. The predetermined distance may be uniform so that the enlarged parts can draw an arc around the one point, and the width of an enlarged part 224a may be uniform in a direction in which the enlarged part 224a is formed. The width of an enlarged part 224b may gradually increase in a direction in which the enlarged part 224b is formed. If the width of the enlarged part 224b gradually increases, it may suggest to the user that as a pan proceeds, a value being controlled increases.

However, the present invention is not limited to this. The predetermined distance may gradually increase or decrease, and the width of the enlarged parts 224 may gradually decrease in a direction in which the enlarged parts 224 are formed. Also, the enlarged parts 224 may have various other shapes with no particular pattern.

Figure 21:
FIG. 21 is a view illustrating a parameter input area according to the second exemplary embodiment that can be formed when a parameter to be set can have both positive and negative values.

FIG. 21 is a view illustrating a parameter input area 22 according to the second exemplary embodiment that can be formed when a parameter to be set can have both positive and negative values.

A parameter to be set may have both positive and negative values. In this case, the parameter input area 22 may be formed to include two regions 221a, as illustrated in FIG. 21. However, since the regions 221a and the regions 222 of FIG. 19B are the same in shape, the user may be confused about whether there are two parameters to be set or there is a single parameter to be set, but the single parameter can have both positive and negative values. Thus, as illustrated in FIG. 21, symbols "+" and "−" may also be displayed to indicate whether the parameter to be set via the regions 221a can be set to a positive or negative value.

Figure 22:
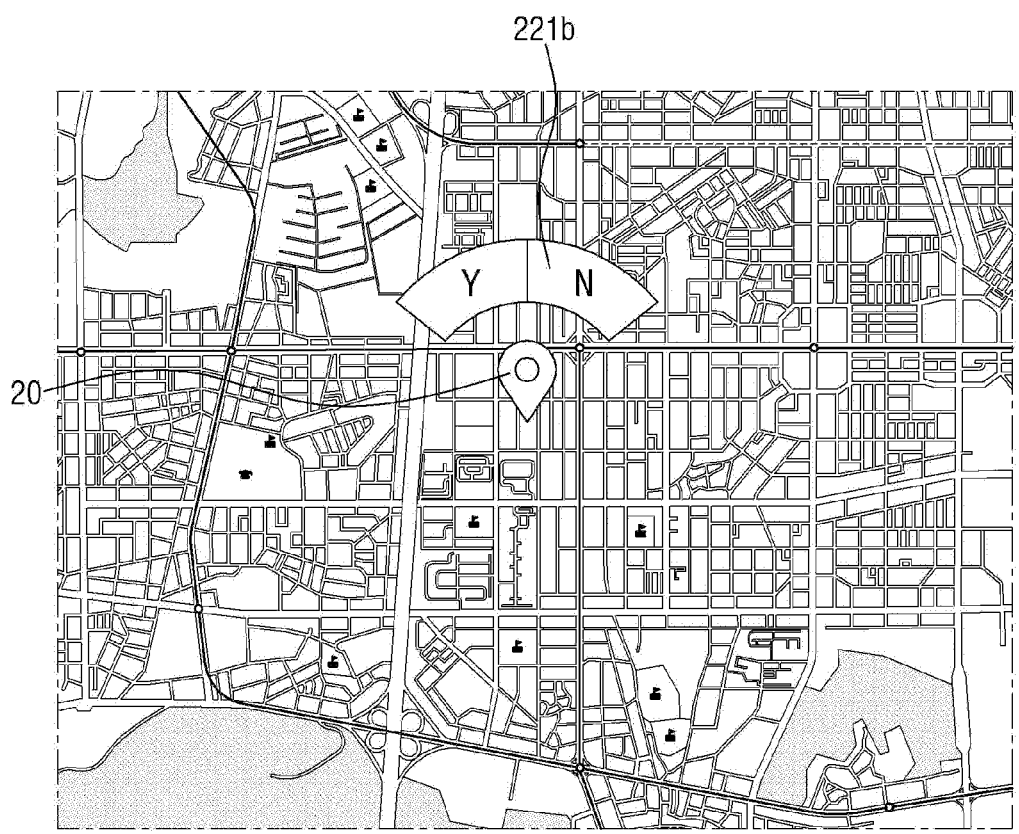
FIGS. 22 and 23 are views illustrating a parameter input area according to a modification of the second exemplary embodiment that can be formed for a parameter to be set with a toggle.
Figure 23:
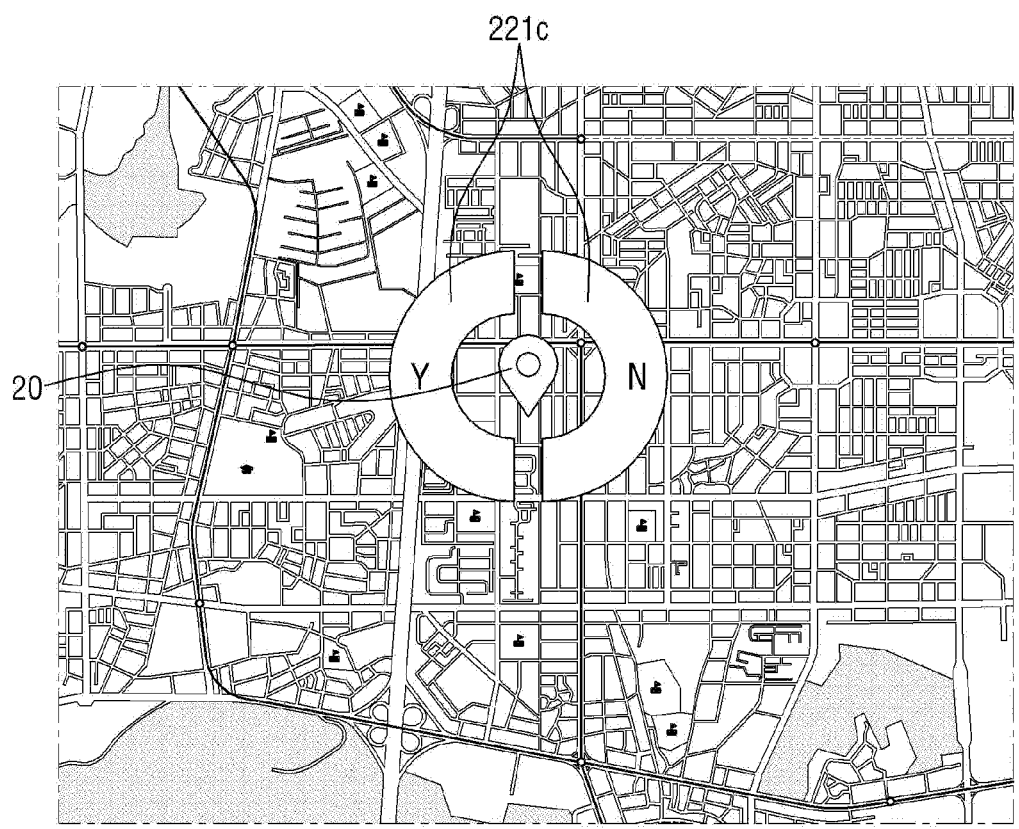
Figure 24:
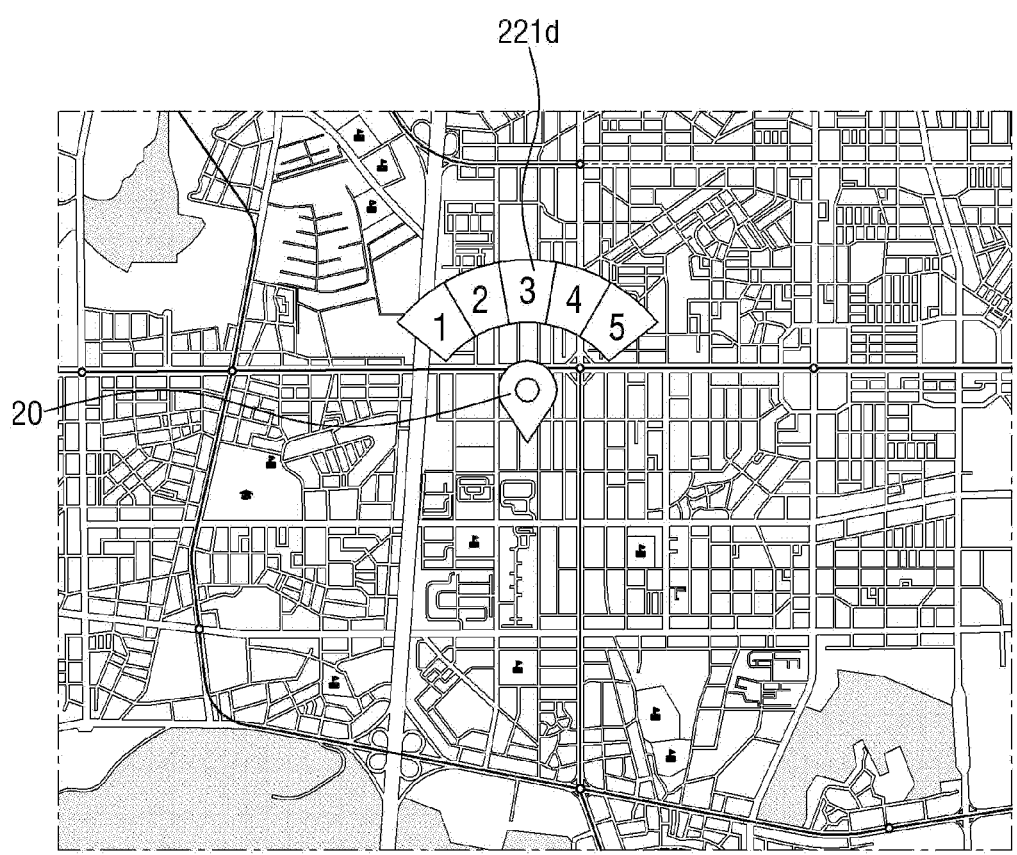
FIG. 24 is a view illustrating a parameter input area according to another modification of the second exemplary embodiment that can be formed for a parameter to be set to a level.

FIGS. 22 and 23 are views illustrating a parameter input area with regions 221b according to a modification of the first exemplary embodiment that can be formed for a parameter to be set with a toggle, and FIG. 24 is a view illustrating a parameter input area with regions 221c according to another modification of the first exemplary embodiment that can be formed for a parameter to be set to a level.

In a case where a parameter needs to be set with a toggle, options such yes or no need to be selected. Thus, as illustrated in FIG. 22 and FIG. 23, each of the parameter input area regions 221b and 221c is divided into two sub-regions, i.e., first and second sub-regions, and the first and second sub-regions may display yes and no, respectively. As illustrated in FIG. 23, two regions may be formed separately to display yes and no.

In a case where a parameter needs to be set to a level, a particular level needs to be selected, instead of adjusting the value of the parameter. Thus, as illustrated in FIG. 24, a parameter input area with region 221d according to another modification of the second exemplary embodiment may be divided into multiple sub-regions, i.e., first, second, and third sub-regions, and the first, second, and third sub-regions may represent first, second, and third levels, respectively.

In the second exemplary embodiment, unlike in the first exemplary embodiment, in a case where a parameter needs to be set with a toggle or needs to be set to a level, there is no need to perform a pan in a direction in which the parameter input area regions 221b, 221c, or 221d is formed. That is, the user may select a yes or no option or a desired level by performing a pan toward a desired sub-region of the parameter input area regions 221b, 221c, or 221d and then returning to the return area.

Figure 25:
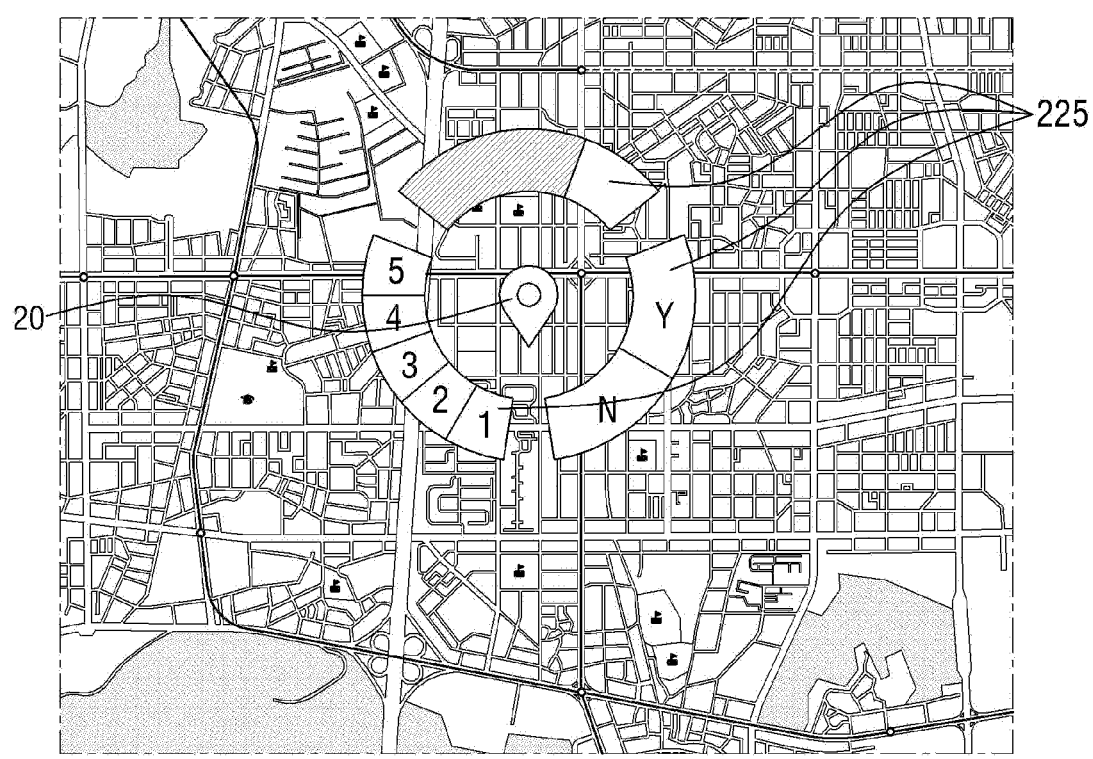
FIG. 25 is a view illustrating a parameter input area according to another modification of the second exemplary embodiment that can be formed when there are multiple parameters to be set and each of the parameters needs to be set in a value setting, toggle setting, or level setting manner.

FIG. 25 is a view illustrating a parameter input area with regions 225 according to another modification of the first exemplary embodiment that can be formed when there are multiple parameters to be set and each of the parameters needs to be set in a value setting, toggle setting, or level setting manner.

When there are multiple parameters to be set, the parameter input area 22 according to the second exemplary embodiment may be formed to include a number of regions corresponding to the number of parameters to be set. As illustrated in FIG. 24, the regions of the parameter input area 22 may be displayed to allow a gauge to be adjusted for parameters that need to be set in a value setting manner, to allow a yes or no option to be selected for parameters that need to be set in a toggle setting manner, and to allow a particular level to be selected for parameters that need to be set in a level setting manner. Then, the user can set each parameter by sequentially performing a pan on each of the regions of the parameter input area regions 225. At this time, a touch made by a finger or the like needs to be maintained from when the one point is selected to when the setting of all parameters is complete and the desired point is set as a waypoint. Accordingly, the inconvenience of repeating multiple touches and touch cancellations on the display unit 11 to set each parameter can be reduced.

Figure 26:
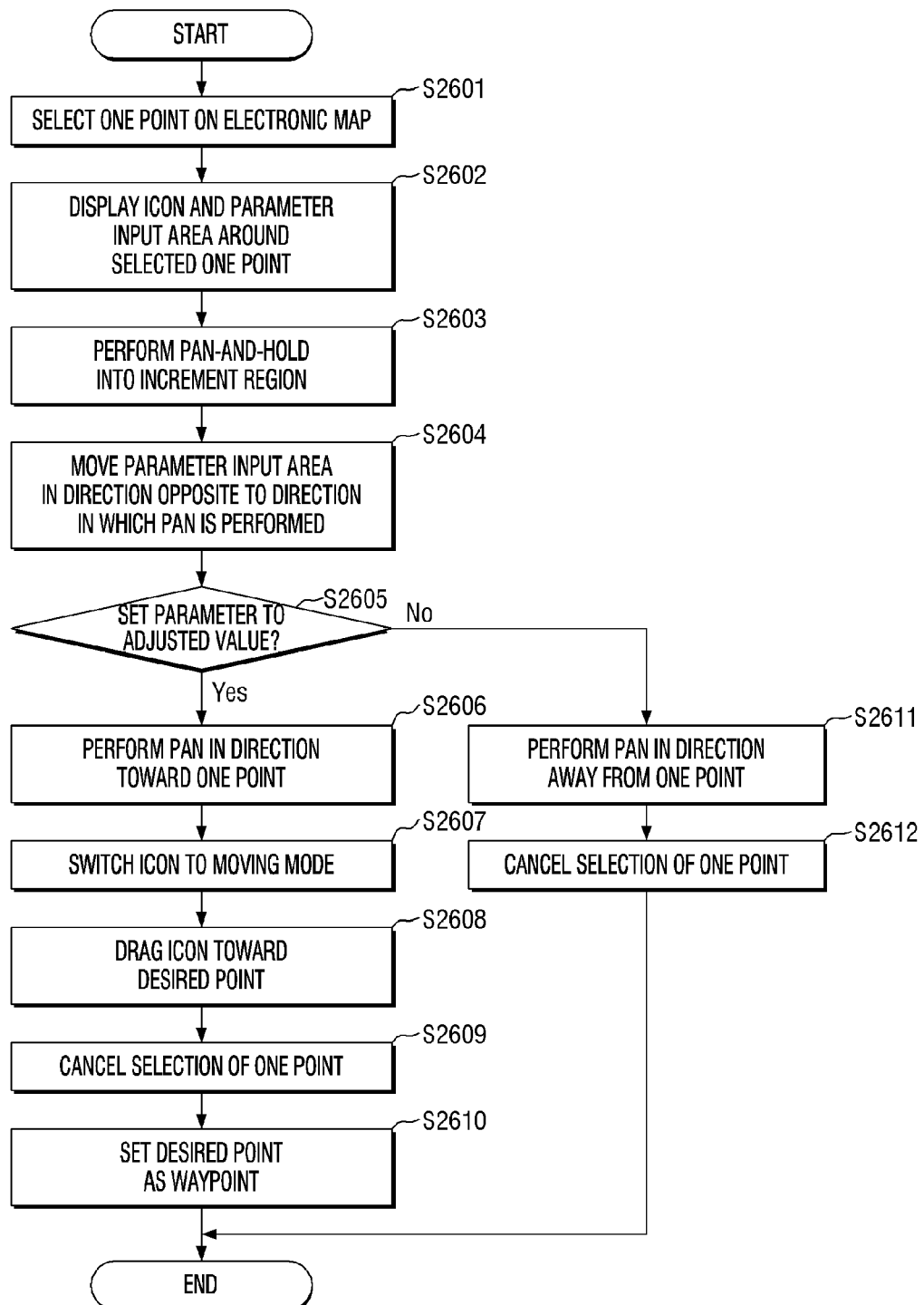
FIG. 26 is a flowchart illustrating a parameter setting method according to a third exemplary embodiment of the present invention.

FIG. 26 is a flowchart illustrating a parameter setting method according to a third exemplary embodiment of the present invention.

Figure 27:
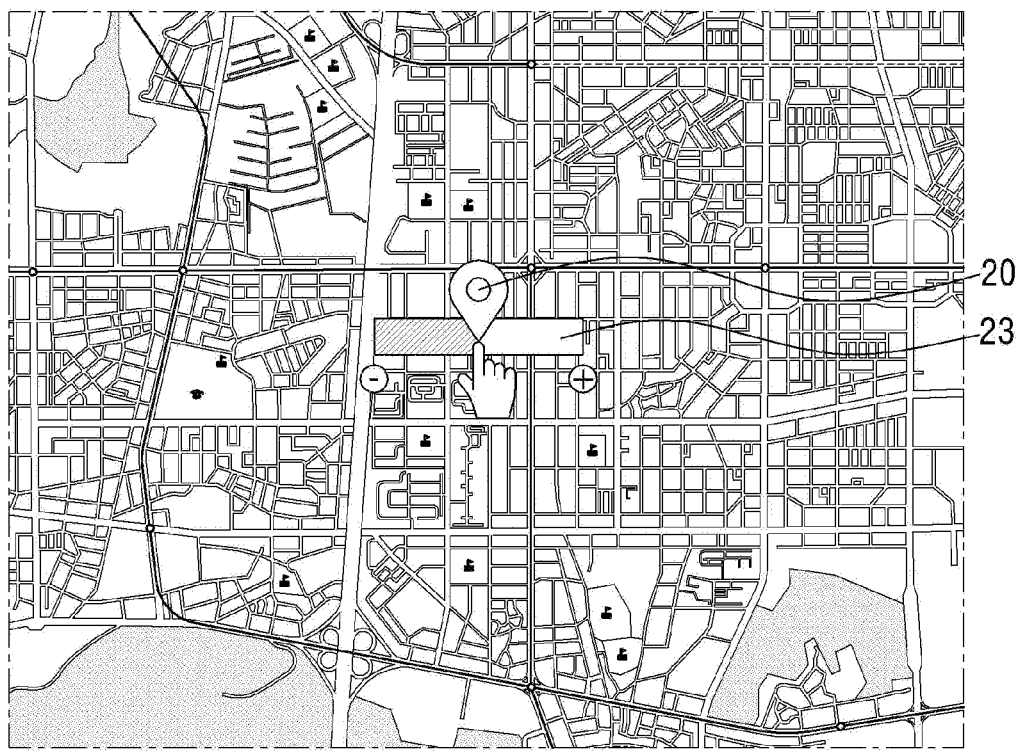
FIG. 27 is a view illustrating a waypoint and a parameter input area according to the third exemplary embodiment that can be formed on the electronic map as a result of the operation of FIG. 3.

In the parameter setting method according to the third exemplary embodiment, as illustrated in FIG. 27, a parameter input area 23 according to the third exemplary embodiment has a bar shape including one point. In the first and second exemplary embodiments, the value of a parameter is adjusted in proportion to the distance of a pan performed in a direction in which the parameter input area 23 is formed. On the other hand, in the third exemplary embodiment, the user selects the one point, performs a pan by as much as a predetermined distance, and maintains the touch or click. Then, the parameter input area 23 is moved on the electronic map 111, and the value of a parameter is adjusted in accordance with the amount of time for which the touch or click is maintained. Each step in the flowchart of FIG. 26 will hereinafter be described with reference to FIGS. 27 through 30. Specifically, the third exemplary embodiment will hereinafter be described, focusing mainly on differences with the first and second exemplary embodiments and omitting any redundant descriptions.

FIG. 27 is a view illustrating a waypoint and the parameter input area 23 according to the third exemplary embodiment that can be formed on the electronic map 111 as a result of the operation of FIG. 3.

Referring again to FIG. 3, in response to the user performing a touch on one point on the electronic map 111 (S2601), an icon 20 is displayed at the one point, and at the same time, the parameter input area 23 is displayed (S2602), as illustrated in FIG. 27.

The parameter input area 23 has a bar shape including the one point where the icon 20 is formed. The parameter input area 23 may preferably be formed in a horizontal direction from the user's viewpoint, and the width of the parameter input area 23 may be uniform in a direction in which the parameter input area 23 is formed. However, the present invention is not limited to this. The width of the parameter input area 23 may gradually increase or decrease in the direction in which the parameter input area 23 is formed. Also, the parameter input area 23 may have various shapes with no particular pattern. If the width of the parameter input area 23 gradually increases, it may suggest to the user that as a pan proceeds, a value being controlled increases.

That is, the parameter input area 23 may have various shapes as long as it can allow the user to perform a pan while maintaining a touch or click and thus to adjust the value of a parameter in proportion to the amount of time for which the touch is maintained.

Figure 28:
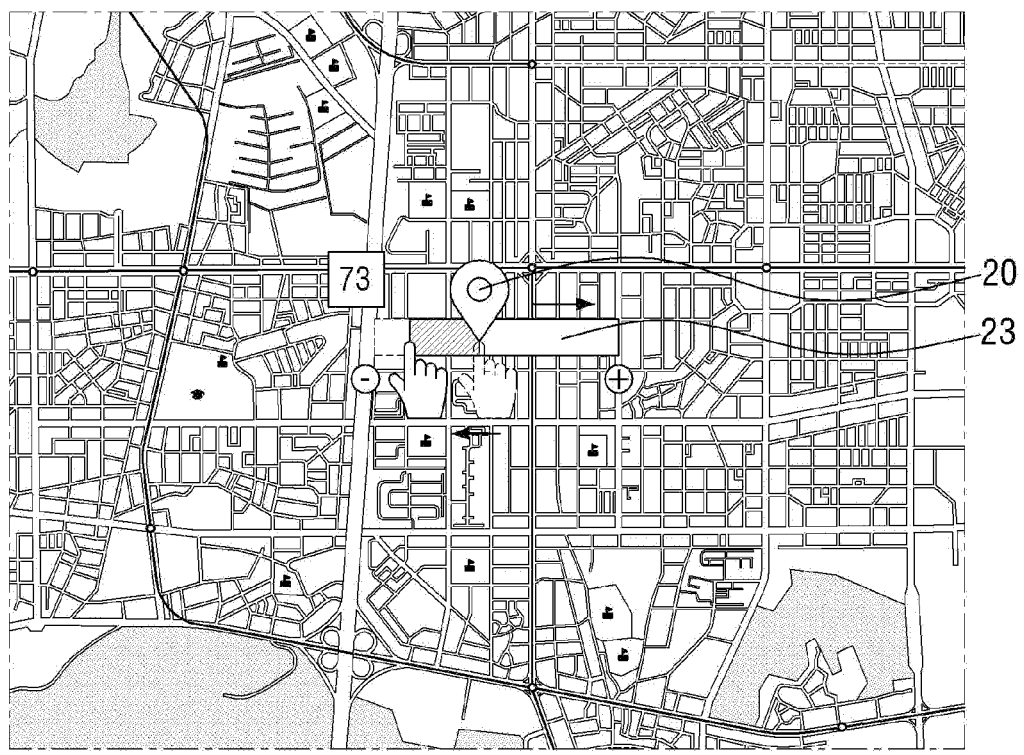
FIG. 28 is a view illustrating how to adjust the value of a parameter via the parameter input area according to the third exemplary embodiment.

FIG. 28 is a view illustrating how to adjust the value of a parameter via the parameter input area 23 according to the third exemplary embodiment.

In order to adjust the value of a parameter, the user performs a touch on the one point with a finger or the like, as illustrated in FIG. 28. Thereafter, a pan-and-hold is performed by as much as a predetermined distance in the direction in which the parameter input area 23 is formed (S2603). Thereafter, the electronic device 1 detects the pan-and-hold. Then, as illustrated in FIG. 28, the parameter input area 23 is moved on the electronic map 111 so that the value of a parameter is adjusted.

At this time, a predetermined distance range in which the electronic device 1 can detect a pan-and-hold needs to be set. Thus, virtual increment/decrement regions need to be additionally defined on or near the left and right sides of the one point that is initially selected. That is, if the user performs a pan so that the touch can enter the range of the increment/decrement regions, the value of a parameter may be raised or lowered. Here, two regions, i.e., a decrement region on the left side of the one point and an increment region on the right side of the one point, may preferably be formed as the increment/decrement regions. The increment/decrement regions may not be displayed via the display unit 11 or may be displayed. Also, the size of the increment/decrement regions may vary for the convenience of the user. That is, in order for the electronic device 1 to operate sensitively, the increment/decrement regions may be set to be relatively wide, and in order for the electronic device 1 to operate less sensitively, the increment/decrement regions may be set to be relatively narrow.

If the user performs a touch on the one point and then performs a pan to enter the increment/decrement regions and then maintains the touch, the parameter input area 23 may be moved on the electronic map 111 so that the value of a parameter is adjusted. At this time, the parameter input area 23 may preferably be moved on the electronic map 111 in a direction opposite to a direction in which the pan is performed (S2604). Specifically, in order for the value of the parameter to be adjusted, a gauge needs to be changed first. Generally, as the reference line of the gauge is changed, the gauge is changed. As illustrated in FIG. 28, the reference line of the gauge passes through the one point, and the one point is not changed unless the icon 20 is moved. Thus, since the reference line of the gauge is fixed, the gauge is changed by moving the parameter input area 23.

Thus, as illustrated in FIG. 28, in response to the user maintaining a touch performed on the one point and performing a pan in a leftward direction by as much as a predetermined distance, the user may enter the decrement region. Then, the parameter input area 23 may be moved to the right, the gauge is lowered, and the value of a parameter corresponding to the gauge is adjusted accordingly. Then, the adjusted value may be displayed near the parameter input area 23.

If the user performs a pan in a rightward direction while maintaining the touch performed on the one point, the user enters the increment region. Then, the parameter input area 23 may be moved to the left, the gauge is raised, and the value of the parameter corresponding to the gauge is adjusted accordingly.

If the user's touch enters the increment region and is maintained, the parameter input area 23 is moved on the electronic map 111, and the value of the parameter is adjusted accordingly. At this time, the amount of movement of the parameter input area 23 is proportional to the amount of time for which the user's touch is maintained. That is, the parameter input area 23 is moved on the electronic map 111 by a predetermined distance increment at intervals of a predetermined amount of time while the user's touch is being maintained. Here, the predetermined amount of time may be about 0.3 to 0.5 seconds, but the present invention is not limited thereto. The predetermined distance increment may be arbitrarily by the user. Also, the predetermined distance increment may vary depending on the distance by which a pan is performed. For example, the shorter the distance by which a pan is performed from the one point, the smaller the distance increment by which the parameter input area 23 is moved, and the longer the distance by which a pan is performed from the one point, the greater the distance increment by which the parameter input area 23 is moved.

Figure 29:
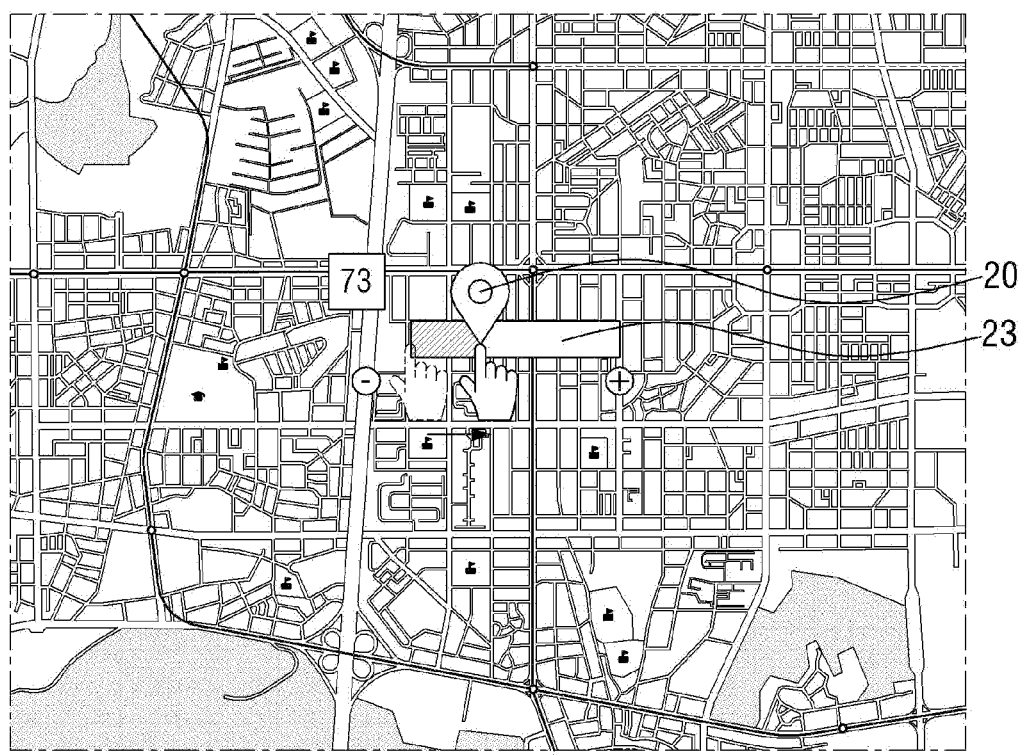
FIG. 29 is a view illustrating how to set the parameter to the value adjusted by the operation of FIG. 28.

FIG. 29 is a view illustrating how to set the parameter to the value adjusted by the operation of FIG. 28.

If the value of the parameter is adjusted to a value desired by the user, the user may perform a pan toward the one point (S2606), as illustrated in FIG. 29, to set the parameter to the adjusted value (S2605). At this time, the touch made by the finger or the like needs to be maintained from when the one point is selected to when the setting of the parameter is complete.

In response to the touch point in the parameter input area 23 entering a return area and a predetermined amount of time elapsing after parameter setting is complete, the icon 20 displayed at the one point may be switched to a moving mode and may thus become movable (S2607) in order that an exact desired point can be precisely selected.

Although not specifically illustrated, the user drags the icon 20 toward the desired point while maintaining the touch made with the finger (S2608) in order to set the desired point as a waypoint. In response to the drag of the icon 20, which is switched to the moving mode, being complete so that the protruding tip of the icon 20 can point to the desired point, the user cancels the touch (S2609), thereby setting the desired point as a waypoint (S2610).

Figure 30:
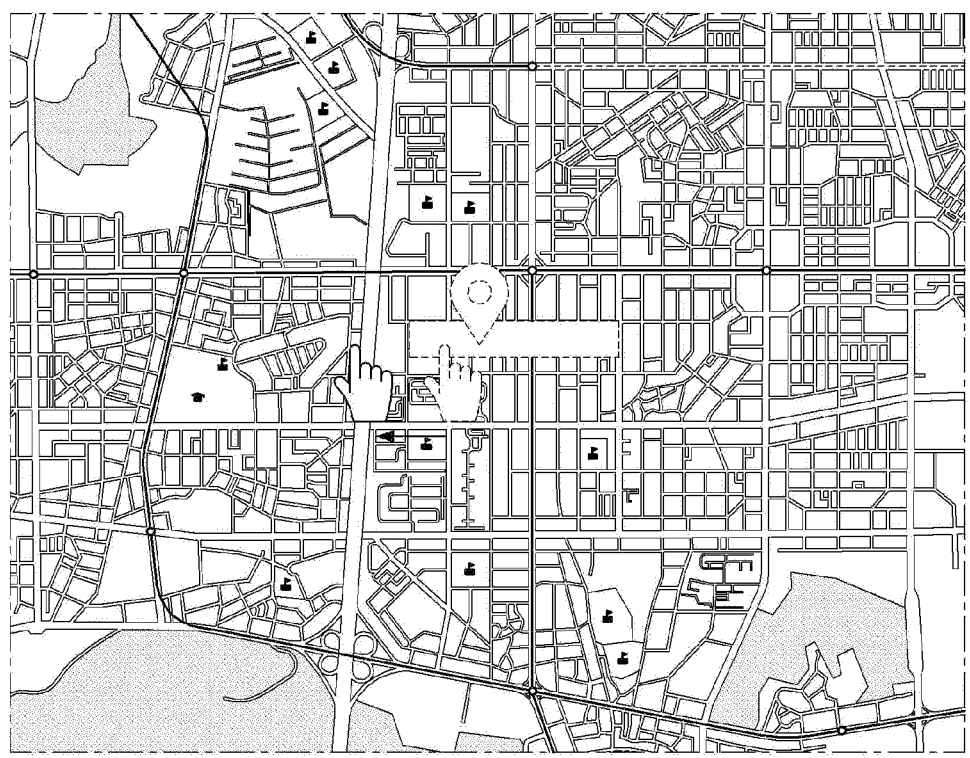
FIG. 30 is a view illustrating how to cancel the selection of the one point as performed in the operation of FIG. 27.

FIG. 30 is a view illustrating how to cancel the selection of the one point as performed in the operation of FIG. 27.

When there is a need to cancel the selection of the one point, the user may perform a pan in a direction away from the one point (S2611), as illustrated in FIG. 30. As a result, the selection of the one point may be cancelled (S1412).

Figure 31:
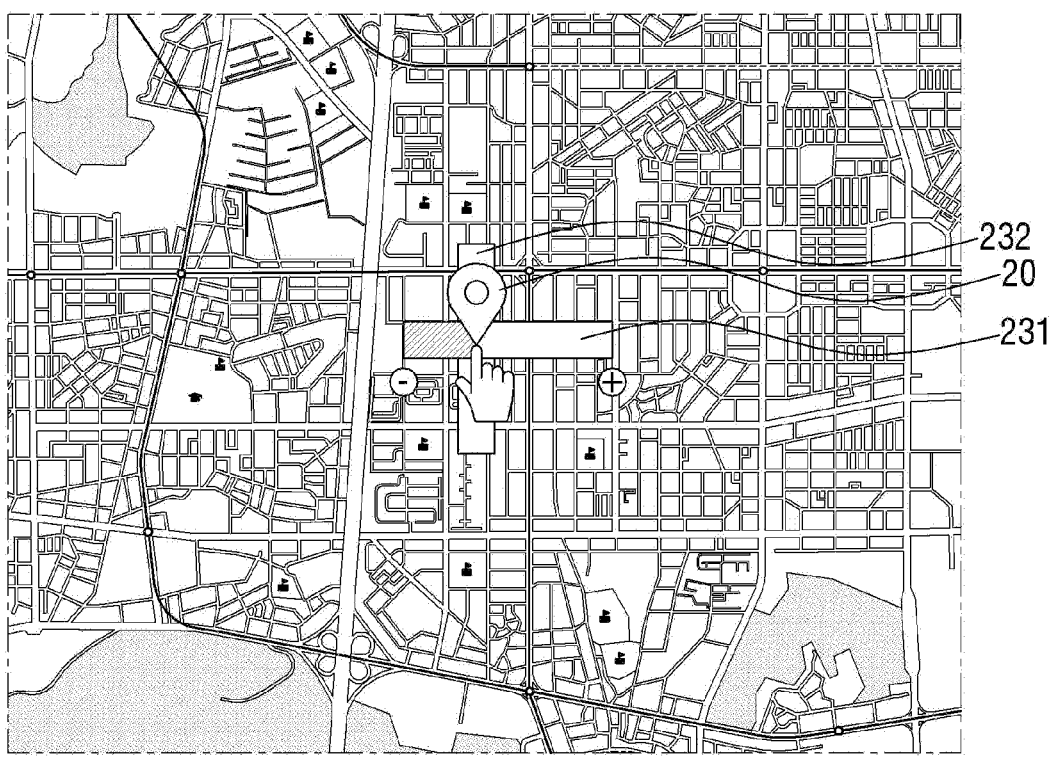
FIG. 31 is a view illustrating a parameter input area according to the third exemplary embodiment that can be formed when there are multiple parameters to be set.

FIG. 31 is a view illustrating a parameter input area 23 according to the third exemplary embodiment that can be formed when there are multiple parameters to be set.

When there is a single parameter to be set, the parameter input area 23 is formed to include a single region 221. On the other hand, when there are multiple parameters to be set, multiple regions may be formed as a parameter input area (regions 231 and 232) according to the third exemplary embodiment, as illustrated in FIG. 31. The multiple regions may preferably be formed to intersect each other in horizontal and vertical directions from the user's view point.

Figure 32:
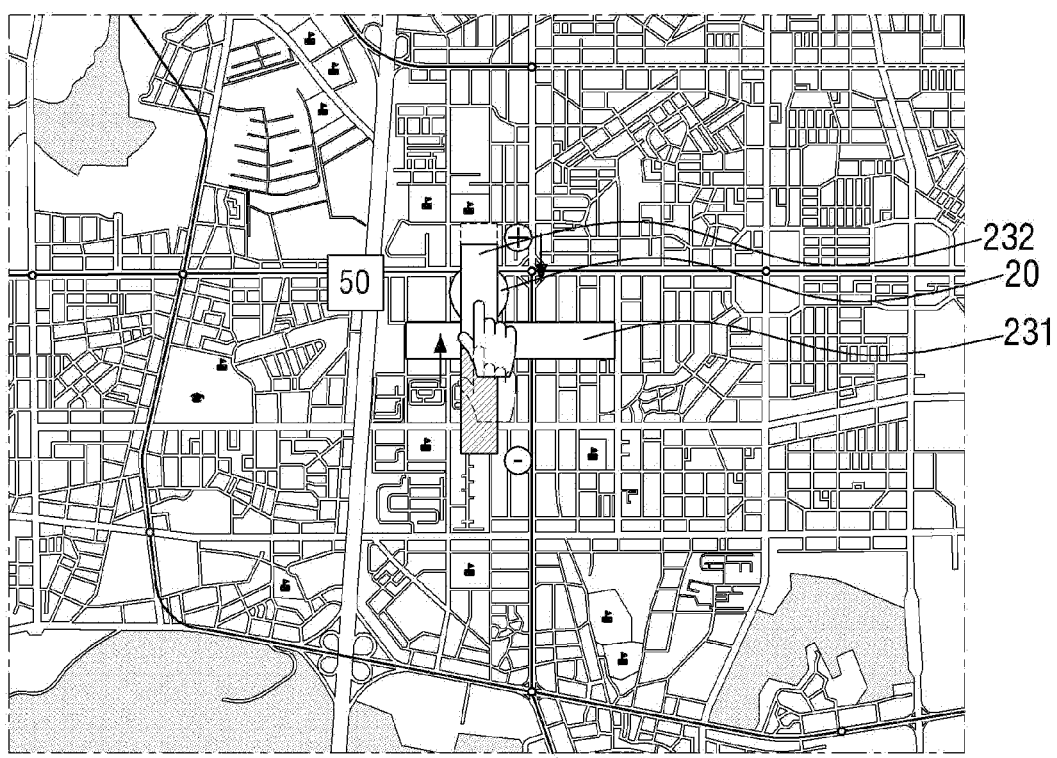
FIG. 32 is a view illustrating how to adjust the value of a second parameter via a second region of the parameter input area according to the third exemplary embodiment.

FIG. 32 is a view illustrating how to adjust the value of a second parameter via a second region of the parameter input area 23 according to the third exemplary embodiment.

When there are multiple parameters to be set, the user may set each of the multiple parameters by sequentially performing a pan on each of the regions of the parameter input area (231 and 232). That is, when the setting of a first parameter is complete, a second parameter may be set.

The first parameter is set by performing the same method as that described above with reference to FIGS. 28 and 29 on a first region 231 of the parameter input area 23. Thus, a description of how to set the first parameter will be omitted.

Once the setting of the first parameter is complete, the first region 231 of the parameter input area 23 is inactivated, and a second region 232 of the parameter input area 23 is activated, as illustrated in FIG. 32.

If the first region 231 is formed in the horizontal direction from the user's viewpoint, the second region 232 is formed in the vertical direction from the user's viewpoint. The increment region of the first region 231 is formed on left and right sides of a return area, and the increment region of the second region 232 is formed on upper and lower sides of the return area.

To set the second parameter, a pan-and-hold is performed toward the increment region in a direction in which the second region 232 of the parameter input area 23 is formed. Then, the electronic device 1 detects the pan-and-hold. Then, as illustrated in FIG. 32, the second region 232 of the parameter input area 23 is moved on the electronic map 111, and the value of the second parameter is adjusted accordingly.

That is, as illustrated in FIG. 32, if the user performs a pan by as much as a predetermined distance in an upward direction while maintaining a touch performed on the one point, the user enters an increment region. Then, the second region 232 of the parameter input area 23 is moved downwards, the gauge is raised, and the value of a second parameter corresponding to the gauge is adjusted accordingly. The adjusted value may be displayed near the parameter input area 23.

Figure 33:
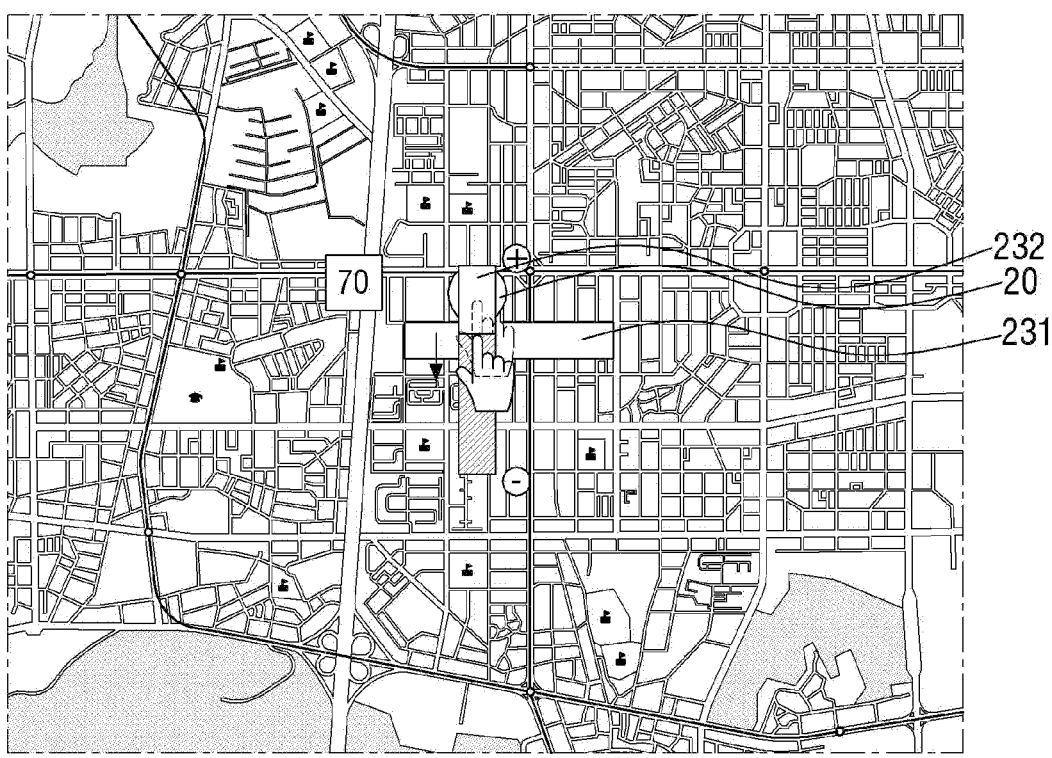
FIG. 33 is a view illustrating how to set the second parameter to the value adjusted by the operation of FIG. 32.

FIG. 33 is a view illustrating how to set the second parameter to the value adjusted by the operation of FIG. 32.

If the value of the second parameter is adjusted to a value desired by the user, the user may perform a pan toward the one point, as illustrated in FIG. 33, to set the second parameter to the adjusted value. At this time, the touch made by the finger or the like needs to be maintained from when the one point is selected to when the setting of all parameters is complete.

In response to the touch point in the parameter input area 23 entering the return area and a predetermined amount of time elapsing after the setting of all parameters is complete, the icon 20 displayed at the one point may be switched to a moving mode and may thus become movable in order that the exact desired point can be precisely selected.

If there is another parameter to be set, the second region 232 of the parameter input area 23 is inactivated, and a third region of the parameter input area 23 is activated when the setting of the second parameter is complete. Here, the third region, like the first region, is formed in the horizontal direction from the user's viewpoint. That is, whenever the setting of a parameter is complete, the parameter input area 23 may be formed alternately in the horizontal and vertical directions for setting a subsequent parameter.

At this time, the touch made by the finger or the like needs to be maintained from when the one point is selected to when the setting of all parameters is complete and the desired point is set as a waypoint. Accordingly, the inconvenience of repeating multiple touches and touch cancellations on the display unit 11 to set each parameter can be reduced.

Figure 34:
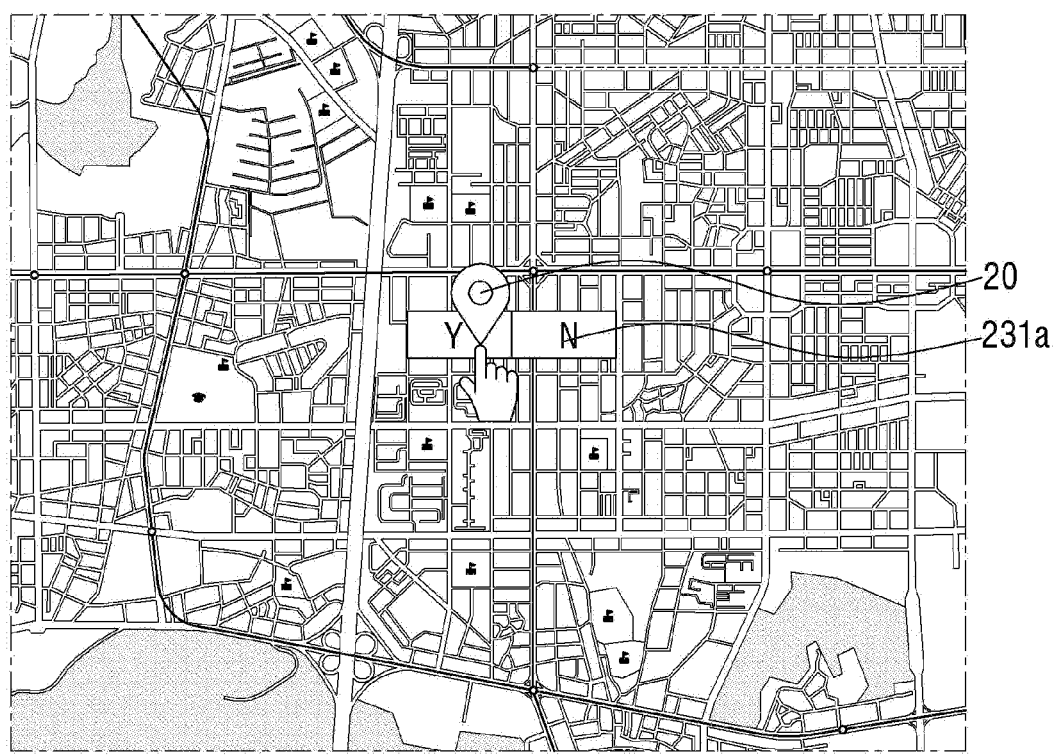
FIG. 34 is a view illustrating a parameter input area according to a modification of the third exemplary embodiment that can be formed for a parameter to be set with a toggle.
Figure 35:
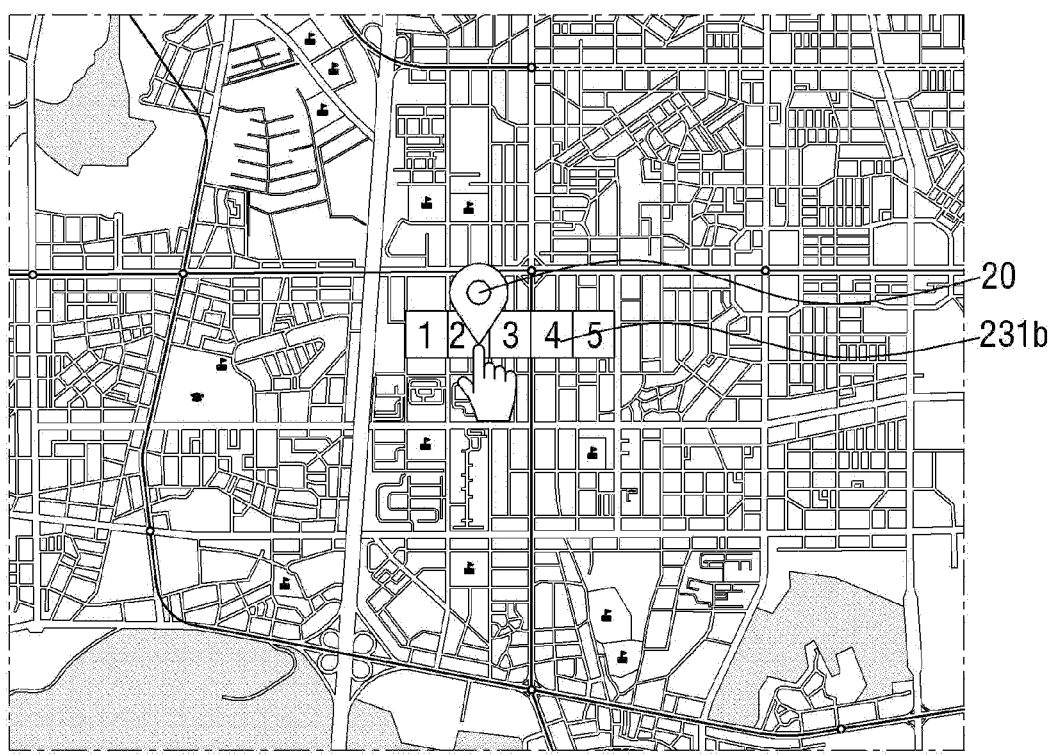
FIG. 35 is a view illustrating a parameter input area according to another modification of the third exemplary embodiment that can be formed for a parameter to be set to a level.

FIG. 34 is a view illustrating a parameter input area with regions 231a according to a modification of the third exemplary embodiment that can be formed for a parameter to be set with a toggle, and FIG. 35 is a view illustrating a parameter input area with regions 231b according to another modification of the third exemplary embodiment that can be formed for a parameter to be set to a level.

In a case where a parameter needs to be set with a toggle, options such yes or no need to be selected. Thus, as illustrated in FIG. 34, the parameter input area with region 231a is divided into two sub-regions, i.e., first and second sub-regions, and the first and second sub-regions may display yes and no, respectively.

In a case where a parameter needs to be set to a level, a particular level needs to be selected, instead of adjusting the value of the parameter. Thus, as illustrated in FIG. 35, the parameter input area region 231b may be divided into multiple sub-regions, i.e., first, second, and third sub-regions, and the first, second, and third sub-regions may represent first, second, and third levels, respectively.

In the third exemplary embodiment, in a case where a parameter needs to be set with a toggle or to be set to a level, unlike in a case where the parameter needs to be set to a value, a touch does not need to be maintained for a predetermined amount of time. That is, if the user performs a touch on the one point, performs a pan in a leftward or rightward direction toward an increment region, and then returns to the return area, a sub-region being selected is moved. For a parameter that needs to be set with a toggle, yes or no option can be selected by performing the above-mentioned process once. For a parameter that needs to be set to a level, a desired level can be selected by repeatedly performing this process until a sub-region corresponding to the desired level is selected.

Figure 36A:
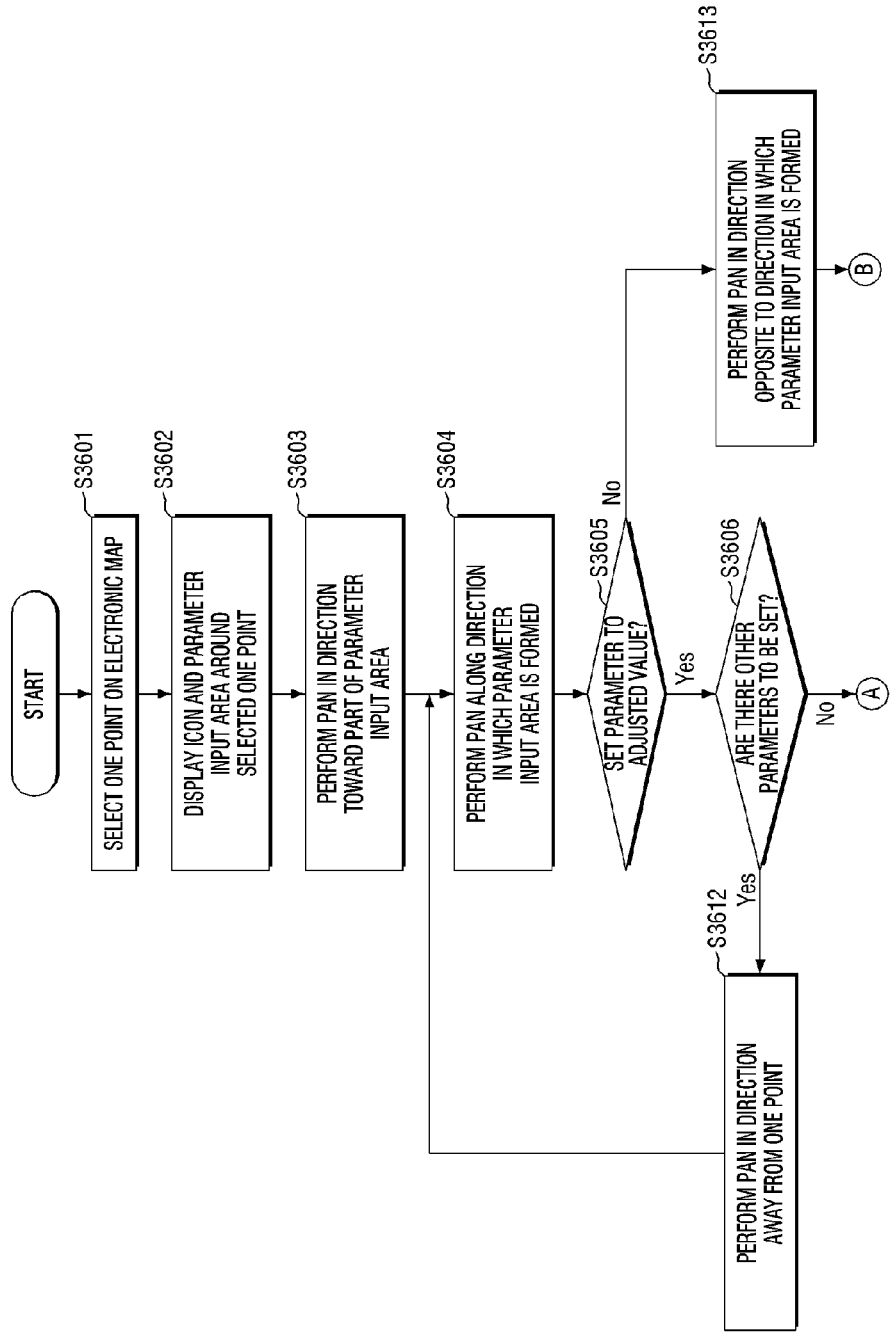

FIGS. 36A and 36B are flowcharts illustrating a parameter setting method according to a fourth exemplary embodiment of the present invention.

Figure 37:
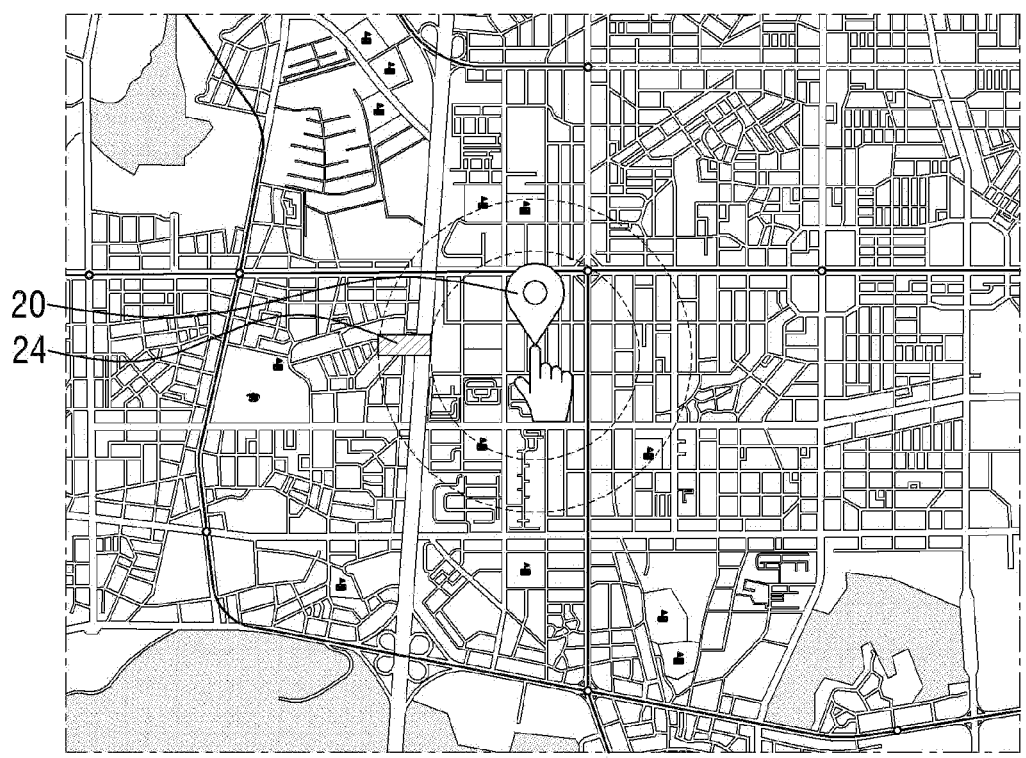
FIG. 37 is a view illustrating how to display a waypoint and a parameter input area according to the fourth exemplary embodiment on the electronic map as a result of the operation of FIG. 3.

In the parameter setting method according to the fourth exemplary embodiment, as illustrated in FIG. 37, a parameter input area 24 according to the fourth exemplary embodiment is not connected to one point. Thus, in the fourth exemplary embodiment, unlike in the first and third exemplary embodiments, the user is required to select the one point and then to perform a pan to move to the parameter input area 24 to adjust the value of a parameter. In this regard, the fourth exemplary embodiment is similar to the second exemplary embodiment. However, the fourth exemplary embodiment differs from the second exemplary embodiment in terms of how to set each parameter when there are multiple parameters to set and how to cancel the one point, and it is much easier to set each parameter according to the fourth exemplary embodiment than according to the second exemplary embodiment, especially when there are a considerable number of parameters to set. Each step in each of the flowcharts of FIGS. 36A and 36B will hereinafter be described with reference to FIGS. 37 through 43. Specifically, the fourth exemplary embodiment will hereinafter be described, focusing mainly on differences with the first, second, and third exemplary embodiments and omitting any redundant descriptions.

FIG. 37 is a view illustrating how to display a waypoint and the parameter input area 24 according to the fourth exemplary embodiment on the electronic map 111 as a result of the operation of FIG. 3.

Referring again to FIG. 3, in response to the user performing a touch on one point on the electronic map 111 (S3601), an icon 20 is displayed at the one point, and at the same time, the parameter input area 24 is displayed (S3602), as illustrated in FIG. 37. In the fourth exemplary embodiment, unlike in the first, second, and third exemplary embodiments, the parameter input area 23 may not be readily displayed as a whole even if the user performs a touch on the one point.

As illustrated in FIG. 37, only a part of the parameter input area 24 may be displayed near the one point selected by the user. If a part of the parameter input area 24 is displayed, the user performs a pan from the one point toward the part of the parameter input area 24 (S3603). However, if the parameter input area 24 is not displayed at all, the user may perform a pan in any direction from the one point, and this will be described later.

The parameter input area 24 is a predetermined distance apart from the one point where the icon 20 is formed. The predetermined distance may be uniform so that the parameter input area 22 can draw an arc around the one point, and the width of the parameter input area 22 may be uniform in a direction in which the parameter input area 24 is formed. However, the present invention is not limited to this. That is, the predetermined distance and the width of the parameter input area 24 may vary.

Figure 38:
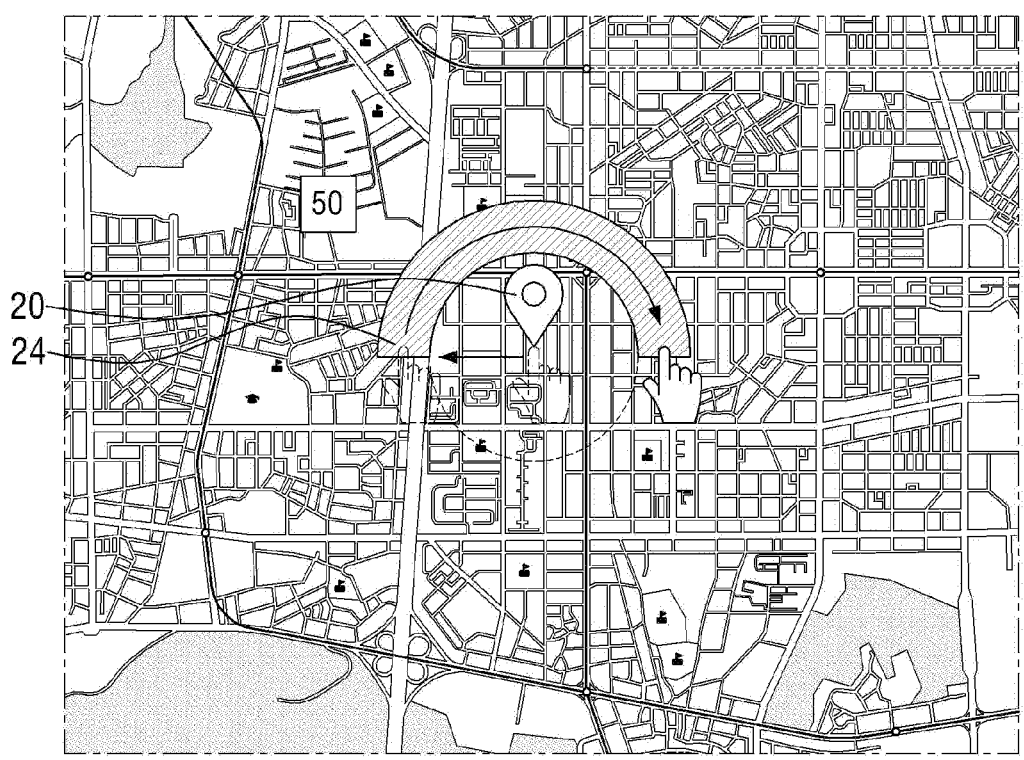
FIG. 38 is a view illustrating how to adjust the value of a parameter via the parameter input area according to the fourth exemplary embodiment.

FIG. 38 is a view illustrating how to adjust the value of a parameter via the parameter input area 24 according to the fourth exemplary embodiment.

In order to adjust the value of a parameter, the user performs a touch on the one point with a finger or the like, as illustrated in FIG. 38. Thereafter, the user performs a pan along a direction toward the parameter input area 24 is formed (S3604).

As illustrated in FIG. 37, if only a part of the parameter input area 24 is displayed in response to the user touching the one point, the user performs a pan from the one point toward the displayed part of the parameter input area 24. Thereafter, as illustrated in FIG. 38, the user performs a pan from the displayed part of the parameter input area 24 along the direction in which the parameter input area 24 is formed (S3604). However, if the parameter input area 24 is not displayed at all, or only the contours or the silhouette thereof is displayed, in response to the user touching the one point, the user may perform a pan in any direction from the one point. However, if the user encounters the parameter input area 24 while performing a pan, a part of the parameter input area 24 is displayed at the location where the user encounters the parameter input area 24. Then, as illustrated in FIG. 38, in response to a part of the parameter input area 24 being displayed, the user performs a pan from the displayed part of the parameter input area 24 in the direction in which the parameter input area 24 is formed (S3604).

As already mentioned above, the parameter input area 24 may form a circle around the one point. Thus, if a pan is performed along the direction in which the parameter input area 24 is formed, the one point is surrounded clockwise by the pan. However, the present invention is not limited to this. That is, the pan may be performed counterclockwise.

As illustrated in FIG. 38, in response to a pan being performed along the direction in which the parameter input area 24 is formed, the trajectory of the user's touch is displayed on the electronic map 111. Also, the value of the parameter may vary depending on the distance by which the pan is performed. That is, as the drag is performed, the parameter input area displayed on the electronic map 111 may serve as a gauge displaying the value of a parameter being adjusted by the user. Thus, if the user performs a pan along the direction in which the second region 242 is formed, the value of a parameter corresponding to the length of the parameter input area 24 displayed on the electronic map 111 is adjusted accordingly. Then, the adjusted value may be displayed near the parameter input area 24.

Figure 39:
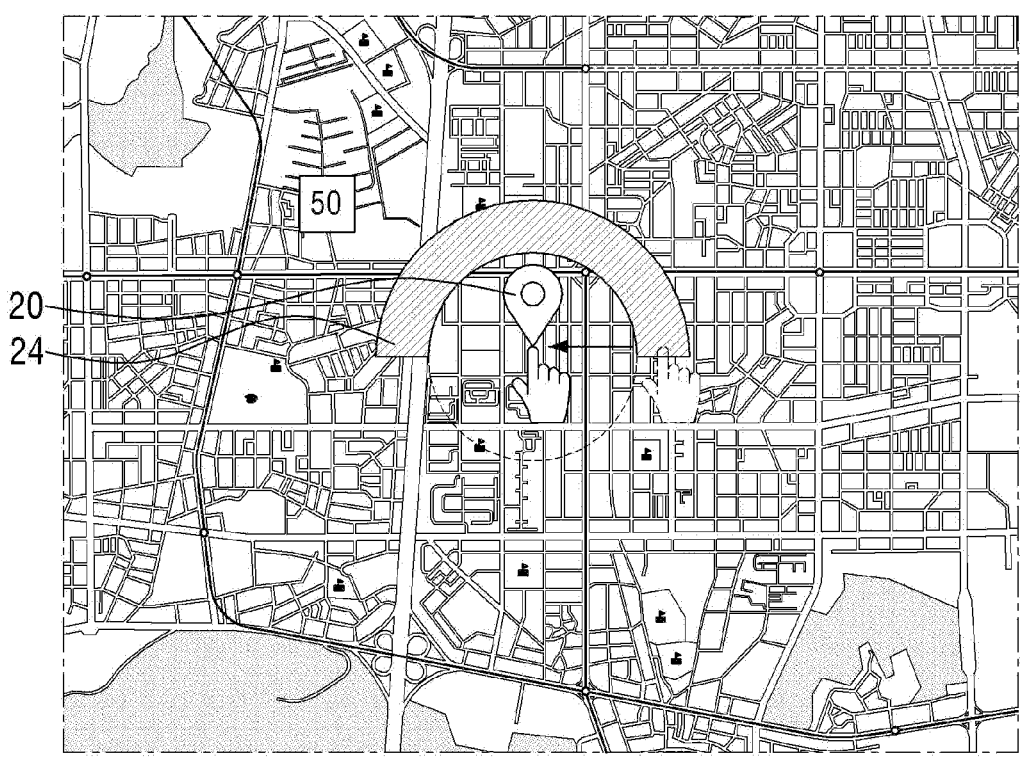
FIG. 39 is a view illustrating how to set the parameter to the value adjusted by the operation of FIG. 38.

FIG. 39 is a view illustrating how to set the parameter to the value adjusted by the operation of FIG. 38.

Figure 41:
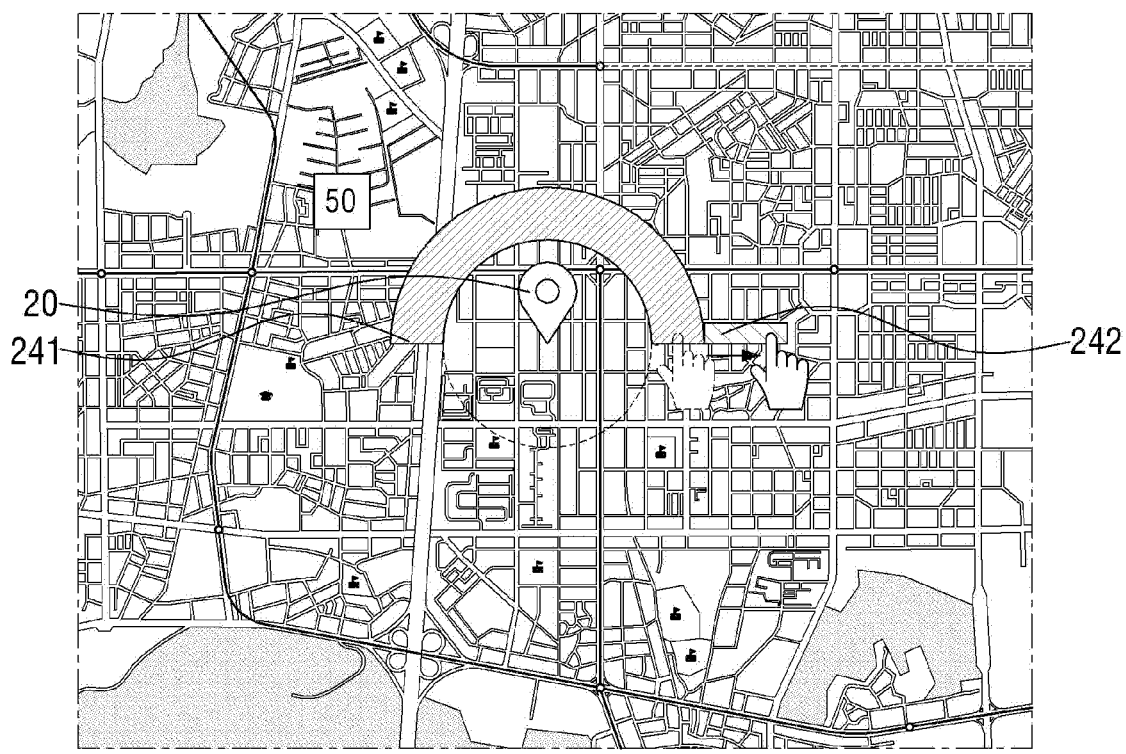
FIG. 41 is a view illustrating how to display a part of the second region of the parameter input area according to the fourth exemplary embodiment.

If the parameter is adjusted to a value desired by the user, the desired value needs to be set as the value of the parameter (S3605). A method to set the parameter may vary depending on the number of parameters to be set. That is, a method to set the parameter may vary depending on whether there are other parameters to be set (S3606). If there is only one parameter to be set, the user performs a pan toward the one point (S3607), as illustrated in FIG. 39, because there is no parameter left to be set. However, if there are multiple parameters to be set, the user performs a pan in a direction away from the one point (S3612), as illustrated in FIG. 41, because there are parameters left to be set. This will be described later in detail.

If there is only one parameter to be set, the user performs a pan toward the one point (S3607), as illustrated in FIG. 39. In response to the touch point in the parameter input area 21 entering the return area and a predetermined amount of time elapsing after parameter setting is complete, the icon 20 displayed at the one point may be switched to the moving mode and may thus become movable (S3608) in order that an exact desired point can be precisely selected. At this time, the touch made by the finger or the like needs to be maintained from when the one point is selected to when the setting of the parameter is complete.

Although not specifically illustrated, the user drags the icon 20 toward the desired point while maintaining the touch made with the finger (S3609) in order to set the desired point as a waypoint. In response to the drag of the icon 20, which is switched to the moving mode, being complete so that the protruding tip of the icon 20 can point to the desired point, the user cancels the touch (S3610), thereby setting the desired point as a waypoint (S3611).

Figure 40:
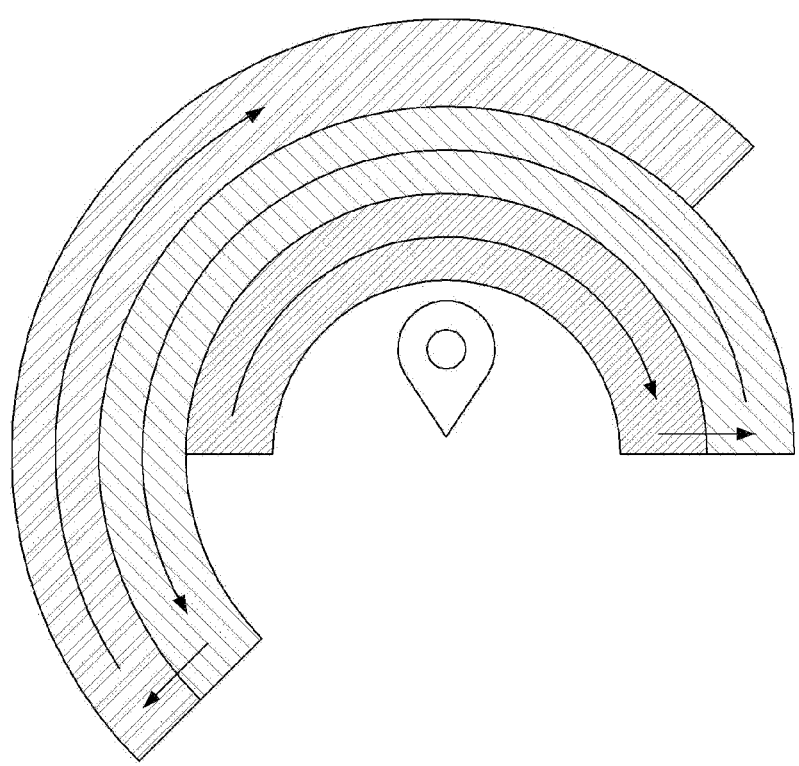
FIG. 40 is a view illustrating a parameter input area according to the fourth exemplary embodiment that can be formed when there are multiple parameters to be set.

FIG. 40 is a view illustrating a parameter input area 24 according to the fourth exemplary embodiment that can be formed when there are multiple parameters to be set.

A case where there is only one parameter to be set has been described above with reference to FIGS. 37 through 39. In this case, the parameter input area 24 is formed to include only one region, as illustrated in FIGS. 37 through 39. On the other hand, when there are multiple parameters to be set, the parameter input area 24 may be formed to include multiple regions, as illustrated in FIG. 40. In this case, the number of regions of the parameter input area 24 corresponds to the number of parameters to be set. However, as already mentioned above, even if the user performs a touch on the one point, the entire parameter input area 24 may not be readily displayed as a whole on the electronic map 111.

As illustrated in FIG. 40, the regions of the parameter input area 24 may be formed to draw concentric circles with different radiuses. The width of each of the regions of the parameter input area 24 may be uniform in a direction in which the corresponding region is formed. However, the present invention is not limited to this. That is, the shape and width of the regions of the parameter input area 24 may vary.

FIG. 41 is a view illustrating how to display a part of the second region of the parameter input area 24 according to the fourth exemplary embodiment.

When there are multiple parameters to be set, the user may set each of the multiple parameters by sequentially performing a pan on each of the regions of the parameter input area 24. That is, when the setting of a first parameter is complete, a second parameter may be set.

The first parameter is set by performing the same method as that described above with reference to FIGS. 38 and 39 on a first region 241 of the parameter input area 24. Thus, a description of how to set the first parameter will be omitted. In this case, unlike in a case where there is only one parameter to be set, the user performs a pan in a direction away from the one point (S3612), as illustrated in FIG. 41, instead of performing a pan in a direction toward the one point, to finish the setting of the first parameter because there are parameters yet to be set.

A second region 242 for setting the second parameter may not be displayed, or only the contours or the silhouette thereof may be displayed, until the setting of the first parameter is complete. At this time, if a pan is performed in a direction away from the one point to finish the setting of the first parameter, a part of the second region 242 is displayed at a location where the user's touch is performed, as illustrated in FIG. 41.

Figure 42:
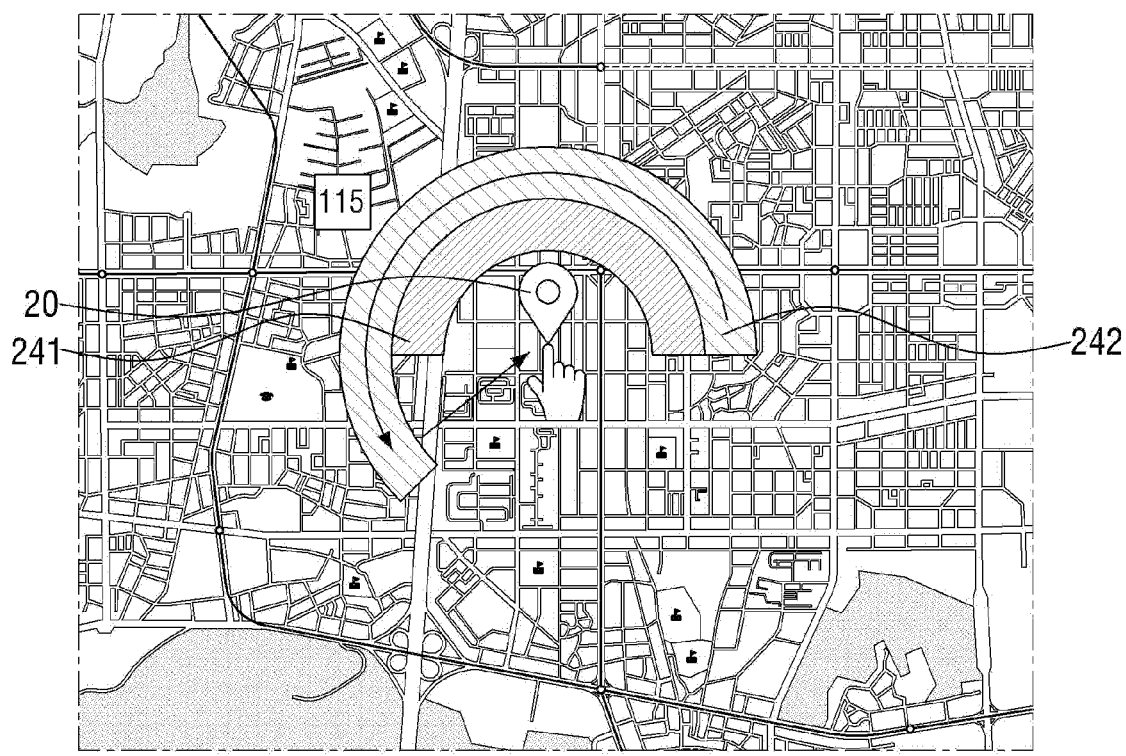
FIG. 42 is a view illustrating how to adjust the value of a second parameter via the second region of the parameter input area according to the fourth exemplary embodiment.

FIG. 42 is a view illustrating how to adjust the value of a second parameter via the second region of the parameter input area 24 according to the fourth exemplary embodiment.

As illustrated in FIG. 42, in response to a part of the second region 242 of the parameter input area 24 being displayed, the user performs a pan from the displayed part of the second region along the direction in which the second region of the parameter input area 24 is formed (S3604). The second region 242 forms a circle around the one point, and thus, if a pan is performed along the direction in which the second region 242 of the parameter input area 24 is formed, the one point is surrounded counterclockwise by the pan. However, if a pan is previously performed counterclockwise in the first region to adjust the value of the first parameter, a pan may preferably be performed clockwise in the second region 242. That is, a direction in which a pan is performed on each of the regions of the parameter input area 24 to adjust the value of each parameter may preferably alternate between clockwise and counterclockwise directions.

As illustrated in FIG. 42, in response to a pan being performed along the direction in which the second region 242 of the parameter input area 24 is formed, the trajectory of the user's touch is displayed on the electronic map 111. Also, the value of the second parameter may vary depending on the distance by which the pan is performed. Thus, if the user performs a pan along the direction in which the second region 242 is formed, the value of a second parameter corresponding to the length of the second region 242 displayed on the electronic map 111 is adjusted accordingly. Then, the adjusted value of the second parameter may be displayed near the parameter input area 24.

If the second parameter is adjusted to a value desired by the user, the desired value needs to be set as the value of the second parameter (S3606). If there are two parameters to be set, the user performs a pan toward the one point (S3607), as illustrated in FIG. 42, because there is no parameter left to be set. However, if there are other parameters left to be set, the user performs a pan in a direction away from the one point (S3612). At this time, if the user performs a pan in a direction away from the one point to finish the setting of the second parameter, a part of a third region is displayed at a location where the user's touch is performed. That is, if the user performs a pan in a direction away from the one point to set a subsequent parameter, another region of the parameter input area 24 is displayed on the outside of a part of a region of the parameter input area 24 corresponding to a current parameter that has been set.

In response to the touch point in the parameter input area 24 entering a return area and a predetermined amount of time elapsing after parameter setting is complete, the icon 20 displayed at the one point may be switched to a moving mode and may thus become movable (S3608) in order that the exact desired point can be precisely selected.

Although not specifically illustrated, the user drags the icon 20 toward the desired point while maintaining the touch made with the finger (S3609) in order to set the desired point as a waypoint. In response to the drag of the icon 20, which is switched to the moving mode, being complete so that the protruding tip of the icon 20 can point to the desired point, the user cancels the touch (S3610), thereby setting the desired point as a waypoint (S3611).

Figure 43:
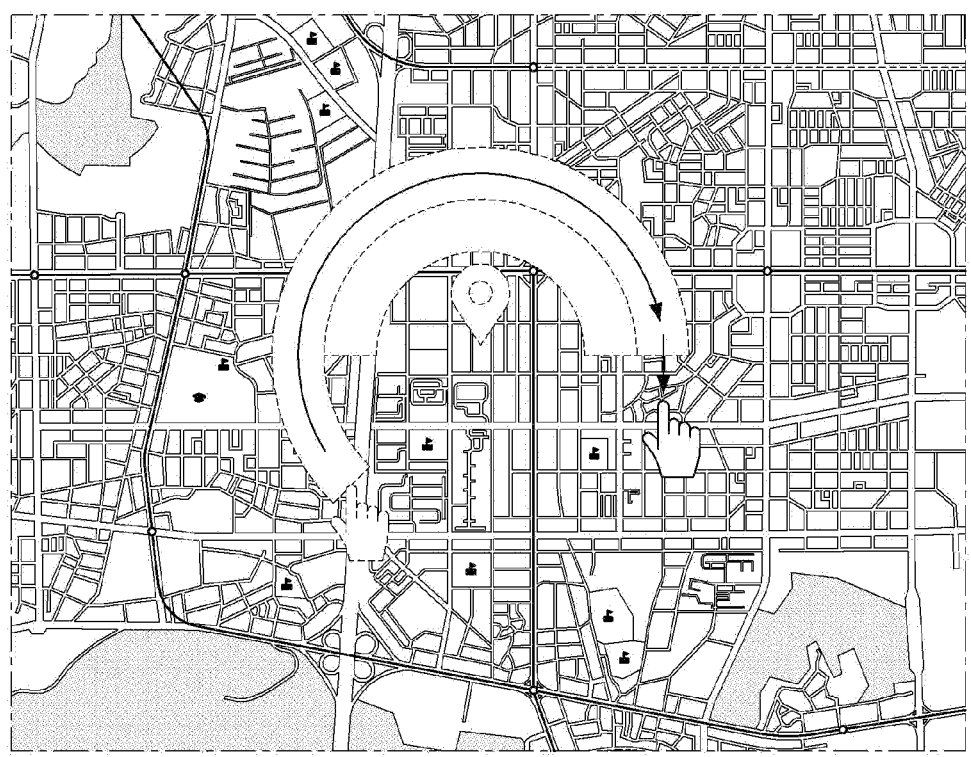
FIG. 43 is a view illustrating how to cancel the selection of one point as performed in the operation of FIG. 37.

FIG. 43 is a view illustrating how to cancel the selection of one point as performed in the operation of FIG. 37.

When there is a need to cancel the selection of the one point, the user may perform a pan in a direction opposite to the direction in which the parameter input area 24 is formed (S3613), as illustrated in FIG. 43. If the value of the parameter is already adjusted to some extent, the value of the parameter may be lowered in response to a pan being performed in the direction opposite to the direction in which the parameter input area 24 is formed. On the other hand, if a pan is performed in the direction opposite to the direction in which the parameter input area 24 is formed to pass through the point that has been initially entered when the value of the parameter is yet to be adjusted, the selection of the one point may be canceled (S3614).

If the value of the parameter is yet to be adjusted, the user already touches the point in the parameter input area 24 that has been initially entered and thus performs a pan along the direction opposite to the direction in which the parameter input area 24 is formed. As a result, the selection of the one point may be cancelled (S3614).

Figure 44:
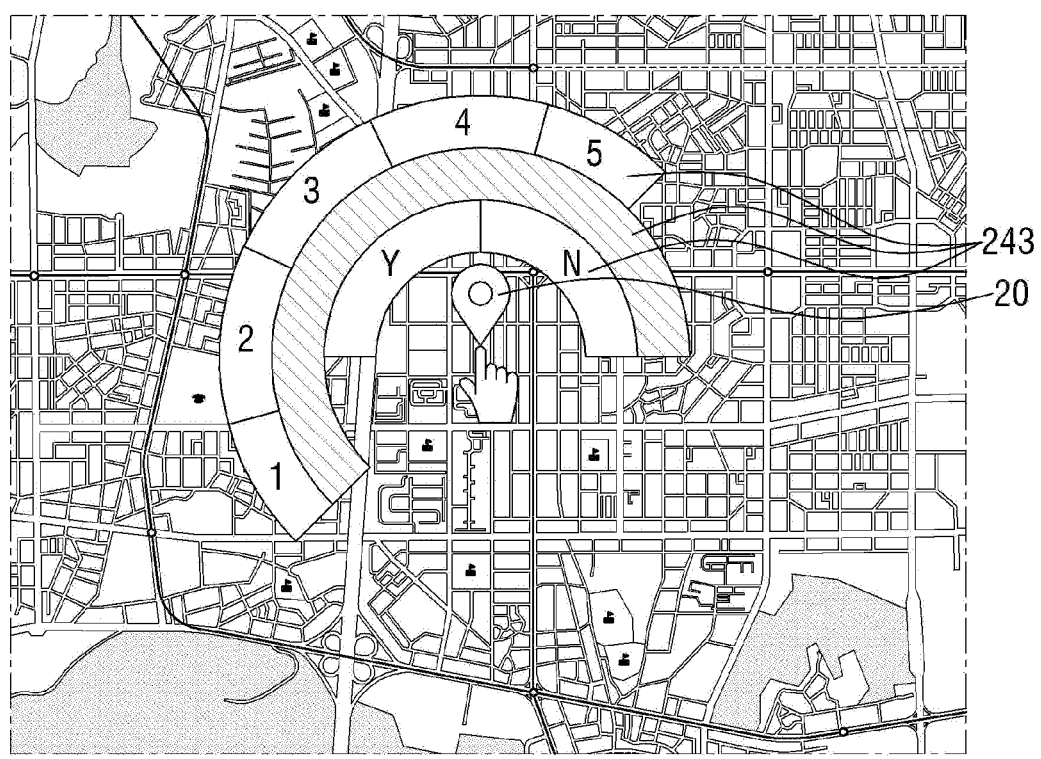
FIG. 44 is a view illustrating a parameter input area according to a modification of the fourth exemplary embodiment that can be formed when there are multiple parameters to be set and each of the parameters needs to be set in a value setting, toggle setting, or level setting manner.

FIG. 44 is a view illustrating a parameter input area 243 according to a modification of the fourth exemplary embodiment that can be formed when there are multiple parameters to be set and each of the parameters needs to be set in a value setting, toggle setting, or level setting manner.

When there are multiple parameters to be set, the parameter input area 24 according to the fourth exemplary embodiment may be formed to include a number of regions corresponding to the number of parameters to be set. As illustrated in FIG. 44, the regions of the parameter input area 24 may be displayed to allow a gauge to be adjusted for parameters that need to be set in a value setting manner, to allow a yes or no option to be selected for parameters that need to be set in a toggle setting manner, and to allow a particular level to be selected for parameters that need to be set in a level setting manner. Then, the user can set each parameter by sequentially performing a pan on each of the regions of the parameter input area 24. At this time, the touch made by a finger or the like needs to be maintained from when the one point is selected to when the setting of all parameters is complete and the desired point is set as a waypoint. Accordingly, the inconvenience of repeating multiple touches and touch cancellations on the display unit 11 to set each parameter can be reduced.

Exemplary embodiments of the present invention have advantages in that a path to be taken by a moving object and waypoints to be passed by the moving object can be easily set on an electronic map, and parameters that need to be set at each of the waypoints can be easily set. Particularly, the inconvenience of repeating multiple touches and touch cancellations on a display unit to set each parameter can be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of setting a parameter on an electronic device, comprising:
    displaying an electronic map on a display of the electronic device, the points in the electronic map being selectable;
    in response to selecting, by a touch or click, one point on the electronic map, displaying an elongated parameter input shape adjacent the selected one point on the electronic map based on the location of the one selected point;
    detecting, by the electronic device, a pan or drag performed along a length of elongation in which the displayed parameter input area is formed;
    in response to the pan or drag performed along the length of elongation, adjusting a numeric value of the parameter according to a detected length of the pan or drag within the parameter input area;
    displaying a visual indication of the adjusted numeric value;
    detecting, by the electronic device, a pan or drag performed in a direction toward or away from the one-point;
    in response to detecting a pan or drag performed towards the one point, setting the parameter to the adjusted value,
    in response to detecting a pan or drag performed away from the one point, cancelling the selection of the point and forgoing setting the parameter,
    wherein the touch or click needs to be maintained while the steps ranging from the selecting the one point to the setting the parameter are being performed.

2. The method of claim 1, further comprising: changing an icon displayed at the one point on the electronic map from a parameter input mode to a moving mode;
    moving, by a drag, the icon toward a desired point; and
    setting the desired point as a waypoint.

3. The method of claim 2, wherein the touch or click needs to be maintained while the steps ranging from the selecting the one point to the setting the desired point as a way point are being performed.

4. The method of claim 1, wherein, if there are multiple parameters to be set, the parameter input area is formed to include multiple regions, and the number of multiple regions corresponds to the number of the multiple parameters.

5. The method of claim 4, further comprising: upon detecting that a pan or drag sequentially has been performed on each of the multiple regions along a direction in which a corresponding region is formed, adjusting values of parameters corresponding to the multiple regions one by one.

6. The method of claim 1, wherein the detecting, by the electronic device, the pan or drag performed along the direction in which the displayed parameter input area is formed comprises if the pan or drag is performed by as much as a predetermined distance and is then maintained for more than a predetermined amount of time, adjusting the value of the parameter in proportion to an amount of time for which the pan or drag is maintained.

7. The method of claim 1, wherein the parameter input area is formed to spiral from the one point.

8. The method of claim 1, wherein, when the parameter input area is formed to be spaced apart from the one point, the adjusting the value of the parameter further comprises detecting, by the electronic device, a pan or drag performed in a direction toward the displayed parameter input area.

9. The method of claim 1, wherein, when the parameter needs to be set with a toggle, the parameter input area corresponding to the parameter is formed to be divided into two sub-regions.

10. The method of claim 1, wherein, when the parameter needs to be set to a level, the parameter input area corresponding to the parameter is formed to be divided into a number of sub-regions corresponding to a number of levels.

11. The method of claim 1, wherein the adjusting the value of the parameter comprises displaying the value of the parameter.

12. An apparatus for setting a parameter, comprising:
    a display unit configured to display an electronic map, the points in the electronic map being selectable;
    a communication unit configured to transmit signals and data to and receiving signals and data from the outside in a wired or wireless manner;
    a storage unit configured to store the signals and the data; and
    a control unit configured to control operations of the display unit, the communication unit, and the storage unit,
    wherein:
    the display unit is configured to display, in response to one point on the electronic map being selected by a touch or click, an elongated parameter input shape adjacent the one point based on the location of the selected one point,
    the control unit is configured to adjust a numeric value of a parameter when a pan or drag is performed on the parameter input area along a length of elongation in which the parameter input area is formed according to a detected length of the pan or drag operation,
    the display unit is configured to display, in response to the adjustment, a visual indication of the adjusted numeric value,
    the control unit is configured to set the parameter to the adjusted value if a pan or drag is performed in a direction toward the one point,
    the control unit is configured to cancel the selection of the one point and forgo setting the parameter if a pan or drag is performed in a direction away from the one point, the operations ranging from the selection of the one point to the setting of the parameters are performed only when the touch or click is maintained.

13. The apparatus of claim 12, wherein: the display unit is further configured to display an icon at the one point on the electronic map; and the control unit is configured to change the icon from a parameter input mode to a moving mode when the parameter is set, and sets a desired point as a waypoint when the icon is moved toward the desired point by a drag.

14. The apparatus of claim 13, wherein the operations ranging from the selection of the one point to the setting of the waypoint are configured to be performed only when the touch or click is maintained.

15. The apparatus of claim 12, wherein, when there are multiple parameters to be set, the parameter input area is configured to include multiple regions, and a number of the multiple regions corresponds to a number of multiple parameters.

16. The apparatus of claim 15, wherein, when the pan or drag is sequentially performed on each of the multiple regions in a direction in which a corresponding region is formed, values of parameters corresponding to the multiple regions are configured to be adjusted one by one.

17. The apparatus of claim 12, wherein, when a pan or drag is performed on the parameter input area by at least a predetermined distance and is then maintained for more than a predetermined amount of time, the value of the parameter is configured to be adjusted in proportion to an amount of time for which the pan or drag is maintained.

18. The apparatus of claim 17, wherein: a gauge is displayed in the parameter input area; and when the pan or drag is performed and then the touch or click is maintained for more than the predetermined amount of time, the parameter input area is configured to change the gauge, and the value of the parameter is configured to be adjusted according to the change in the gauge.

* * * * *